(12) United States Patent
Rocco et al.

(10) Patent No.: US 8,627,876 B2
(45) Date of Patent: Jan. 14, 2014

(54) MOLDING TOOL WITH CONFORMAL PORTIONS AND METHOD OF MAKING THE SAME

(75) Inventors: Charles Alan Rocco, Milford, MI (US); Jeffery N. Conley, Belleville, MI (US); Raymond Edward Kalisz, Livonia, MI (US); Bernie Gerard Marchetti, Rochester Hills, MI (US); Larry Edward Ellis, Dearborn Heights, MI (US); Harold P. Sears, Livonia, MI (US); James Todd Kloeb, Armada, MI (US); Alan Lawrence Jacobson, Ann Arbor, MI (US); Ronald Hasenbusch, Grosse Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/408,244

(22) Filed: Feb. 29, 2012

(65) Prior Publication Data

US 2013/0220573 A1    Aug. 29, 2013

(51) Int. Cl.
*B22C 9/02* (2006.01)

(52) U.S. Cl.
USPC .......................................................... 164/349

(58) Field of Classification Search
USPC .......................... 164/6, 15, 23, 159, 349, 520
See application file for complete search history.

(56) References Cited

U.S. PATENT DOCUMENTS

| 5,387,380 | A | 2/1995 | Cima et al. |
|---|---|---|---|
| 5,445,210 | A * | 8/1995 | Brassell ........................ 164/369 |
| 7,291,002 | B2 | 11/2007 | Russell et al. |
| 7,807,077 | B2 | 10/2010 | Hochsmann et al. |
| 7,832,457 | B2 | 11/2010 | Calnan et al. |
| 2008/0105996 | A1 | 5/2008 | Kloeb et al. |
| 2008/0237933 | A1 | 10/2008 | Hochsmann et al. |
| 2011/0167734 | A1 | 7/2011 | Jiang et al. |

FOREIGN PATENT DOCUMENTS

WO     2010144786   A2    12/2010

\* cited by examiner

*Primary Examiner* — Kevin P Kerns
(74) *Attorney, Agent, or Firm* — Damian Porcari; Price Heneveld LLP

(57) ABSTRACT

A mold core package for forming a molding tool includes a plurality of stacked particulate layers having a binding agent. The plurality of stacked particulate layers form sacrificial walls defining a mold cavity. A sacrificial displacement line and a sacrificial displacement body extend from the mold core package and are adapted to displace a molten material applied to the mold core package.

5 Claims, 25 Drawing Sheets

MOLDING TOOL WITH CONFORMAL PORTIONS AND METHOD OF MAKING THE SAME

CROSS-REFERENCE TO RELATED APPLICATIONS

This application is related to the following applications: U.S. patent application No. 13/408,218, filed on Feb. 29, 2012, entitled "MOLD CORE FOR FORMING A MOLDING TOOL"; U.S. patent application Ser. No. 13/408,231, filed on Feb. 29, 2012, entitled "MOLDING ASSEMBLY WITH HEATING AND COOLING SYSTEM"; U.S. patent application Ser. No. 13/408,238, filed on Feb. 29, 2012, entitled "INTERCHANGEABLE MOLD INSERTS"; U.S. patent application Ser. No. 13/407,911, filed on Feb. 29, 2012, entitled "MOLD CORE PACKAGE FOR FORMING A POWDER SLUSH MOLDING TOOL"; and U.S. patent application Ser. No. 13/407,914, filed on Feb. 29, 2012, entitled "ADDITIVE FABRICATION TECHNOLOGIES FOR CREATING MOLDS FOR DIE COMPONENTS", the entire disclosures of which are hereby incorporated herein by reference.

FIELD OF THE INVENTION

The present invention generally relates to a tool with conformal heating and cooling lines and to a method of making the same.

BACKGROUND OF THE INVENTION

Molds are often used in the fabrication of molding tools for use in molding operations. Traditional methods for making molding tools vary depending on the application and formed product requirements.

SUMMARY OF THE INVENTION

According to one aspect of the present invention, a mold core package for forming a molding tool includes a plurality of stacked particulate layers having a binding agent. The plurality of stacked particulate layers form sacrificial walls defining a mold cavity. A sacrificial displacement line and a sacrificial displacement body extend from the mold core package and are adapted to displace a molten material applied to the mold core package.

According to another aspect of the present invention, a method of making a molding tool includes: (a) depositing a thin layer of particulate; and (b) selectively applying a binding agent to the thin layer of particulate to define a cross-section of a mold core package. Repeating steps (a) and (b) produce a mold core package having a sacrificial displacement body proximate a mold core package wall defining a mold surface. A molten material is applied to the mold core package to form a molding tool.

According to yet another aspect of the present invention, a method for making a molding tool includes: (a) depositing a thin layer of particulate; and (b) selectively applying a binding agent to the thin layer of particulate to define a cross-section of a mold core package. Repeating steps (a) and (b) produce a mold core package having a sacrificial displacement body and a sacrificial displacement line. A molten material is applied to the mold core package such that the sacrificial displacement body and the sacrificial displacement line form voids in the mold core.

Still another aspect of the present invention includes a sandprinting device adapted to print multiple layers of binder on multiple layers of sand to form a mold core package. The mold core package is used to construct either an insert mold, a base mold, or a molding tool that is used to make molded parts. The insert mold or molding tool includes conformal lines adapted to receive a heating fluid or a cooling fluid to aid in the formation of molded parts inside the insert mold or molding tool. The conformal lines closely follow a forming surface that is proximate a mold cavity of the insert mold or molding tool.

These and other aspects, objects, and features of the present invention will be understood and appreciated by those skilled in the art upon studying the following specification, claims, and appended drawings.

DETAILED DESCRIPTION OF THE EMBODIMENTS

Figure 1:
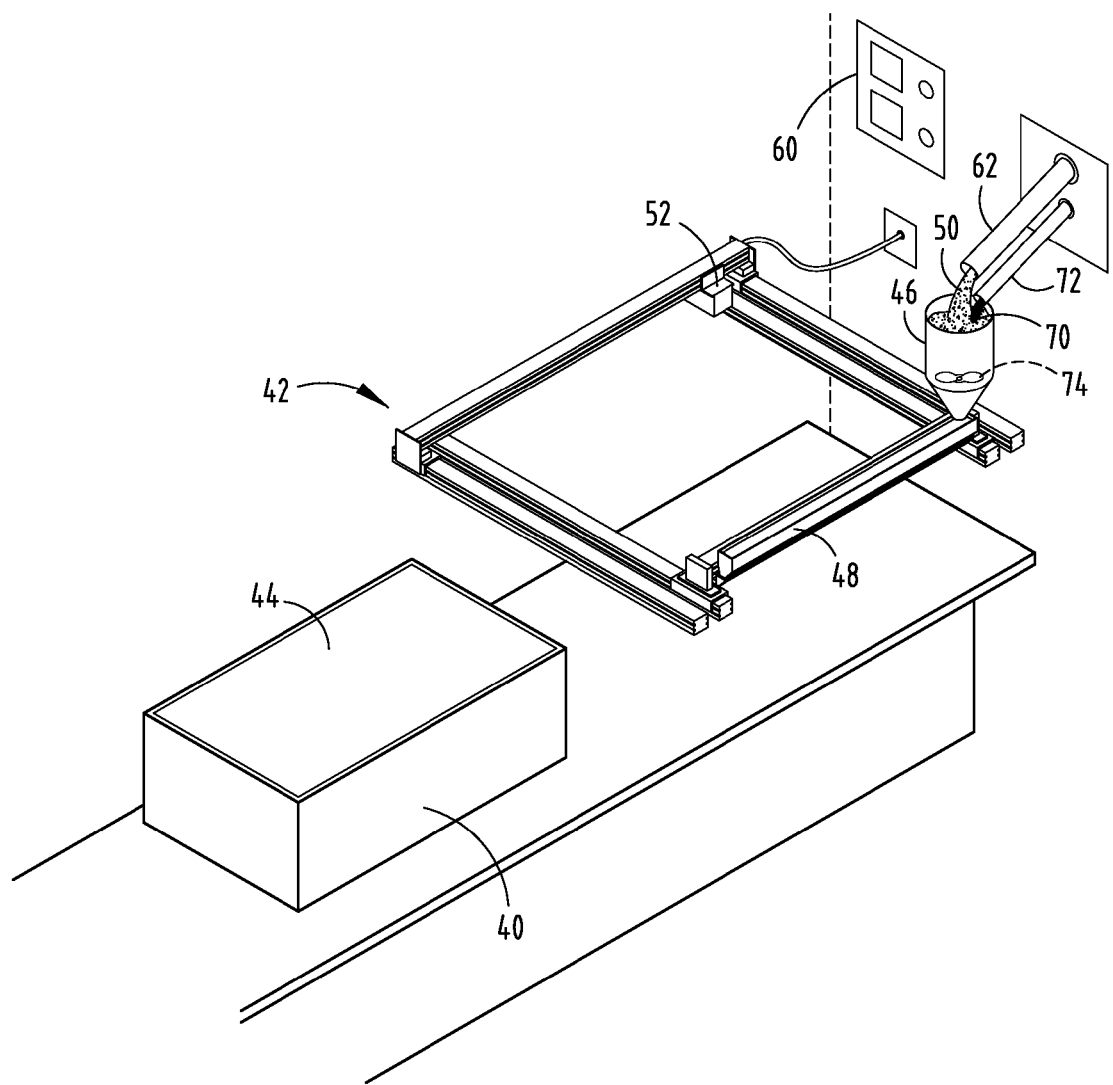
FIG. 1 is a top perspective view of a rigid containment box or job box prior to formation of a mold core package by a sandprinting device.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1-27, a mold core package 10 is illustrated. The mold core package 10 is used to form a molding tool 12. The mold core package 10 includes a plurality of stacked particulate layers 14 having a binding agent 16. The plurality of stacked particulate layers 14 form sacrificial walls 18. An elongate sacrificial particulate line 20 extends through the mold core package 10 and defines a conformal line 22 in the molding tool 12. A mold cavity 26 is defined by the plurality of stacked particulate layers 14.

It is contemplated that the molding tool 12 could be used in any of a variety of molding operations. Such molding operations may include injection molding, foam molding, blow molding, thermoforming, transfer molding, reaction injection molding, compression molding, extrusion, etc. The molding tool 12, as set forth in the following description, is used for injection molding applications. However, it will be understood by one having ordinary skill in the art that the molding tool 12 that is fabricated by the use of the mold core package 10 can be used for any of the aforementioned molding applications.

Referring now to FIGS. 1-6, a pattern box or job box 40 formed from any of a number of materials including wood, metal, etc., is positioned below a printing device 42. The job box 40 defines a print area 44 within which the mold core package 10 (FIG. 8) will be constructed from the plurality of stacked particulate layers 14. The printing device 42 includes a hopper 46 and a deposition trough 48, which lays a thin layer of activated fine particulates 50, such as silica, sand, ceramic-sand mixtures, etc., inside the print area 44. The particulates 50 may be of any size, including 0.002 mm to 2 mm in diameter. The printing device 42 also includes a binder deposition device or a binder dispenser 52. As disclosed in detail below, the binder dispenser 52 sprays a thin layer of a binder or binding agent 16 in the shape of a single layer of the desired mold core package 10. Repetition of the layering of sand and spraying of binding agent 16 by the binder dispenser 52 on the fine particulates 50 results in the production of three-dimensional (3D) mold core patterns 10. The 3D mold core patterns 10 are generated over a length of time sufficient to print on each thin layer of fine particulates 50. The mold core package 10 generated will ultimately be used to fabricate the molding tool 12 that is used to make molded parts.

Figure 8:
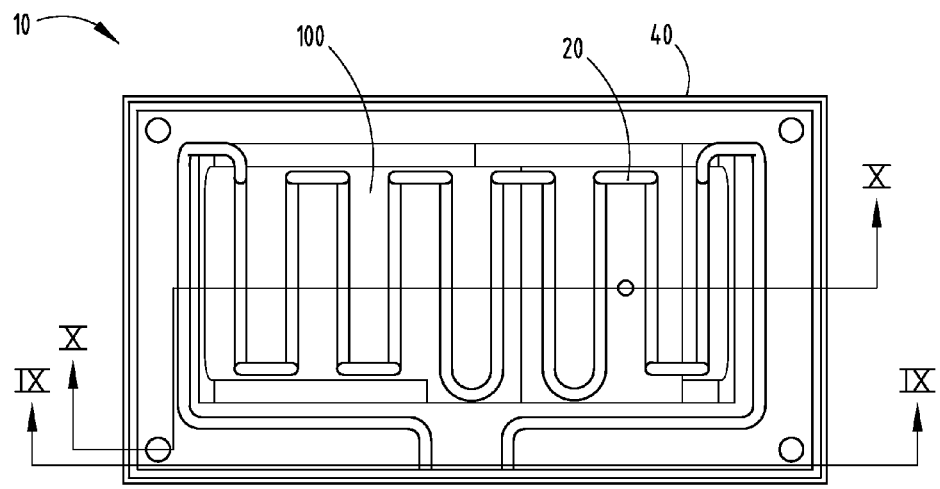
FIG. 8 is a top plan view of a mold core package of FIG. 7A.

Referring to FIG. 1, initially, a computer-aided design (CAD) program running in a computer 60 coupled with the printing device 42 that includes the desired shape of the end product is fed into the CAD program of the printing device 42. It is contemplated that CAD, or any other form of 3D modeling software, can be used to provide sufficient information for the 3D printing device 42 to form the desired mold core package 10 (FIG. 8). Prior to activation of the 3D printing device 42, a predetermined quantity of the fine particulates 50 is dumped into the hopper 46 by a particulate spout 62, along with an activation coating or activator 70 supplied by an activator spout 72. Although the illustrated embodiment uses a fine sand as the fine particulate 50, as noted above, the fine particulate 50 may include any of a variety of materials or combinations thereof. The fine particulates 50 are mixed in the hopper 46 with the activator 70. The mixture of fine particulates 50 and activator 70 may be mixed by an agitator 74 or other such agitating device such that the fine particulates 50 become activated. After the fine particulates 50 and activator 70 have been thoroughly mixed, the fine particulates 50 are moved to the deposition trough 48.

Figure 2:
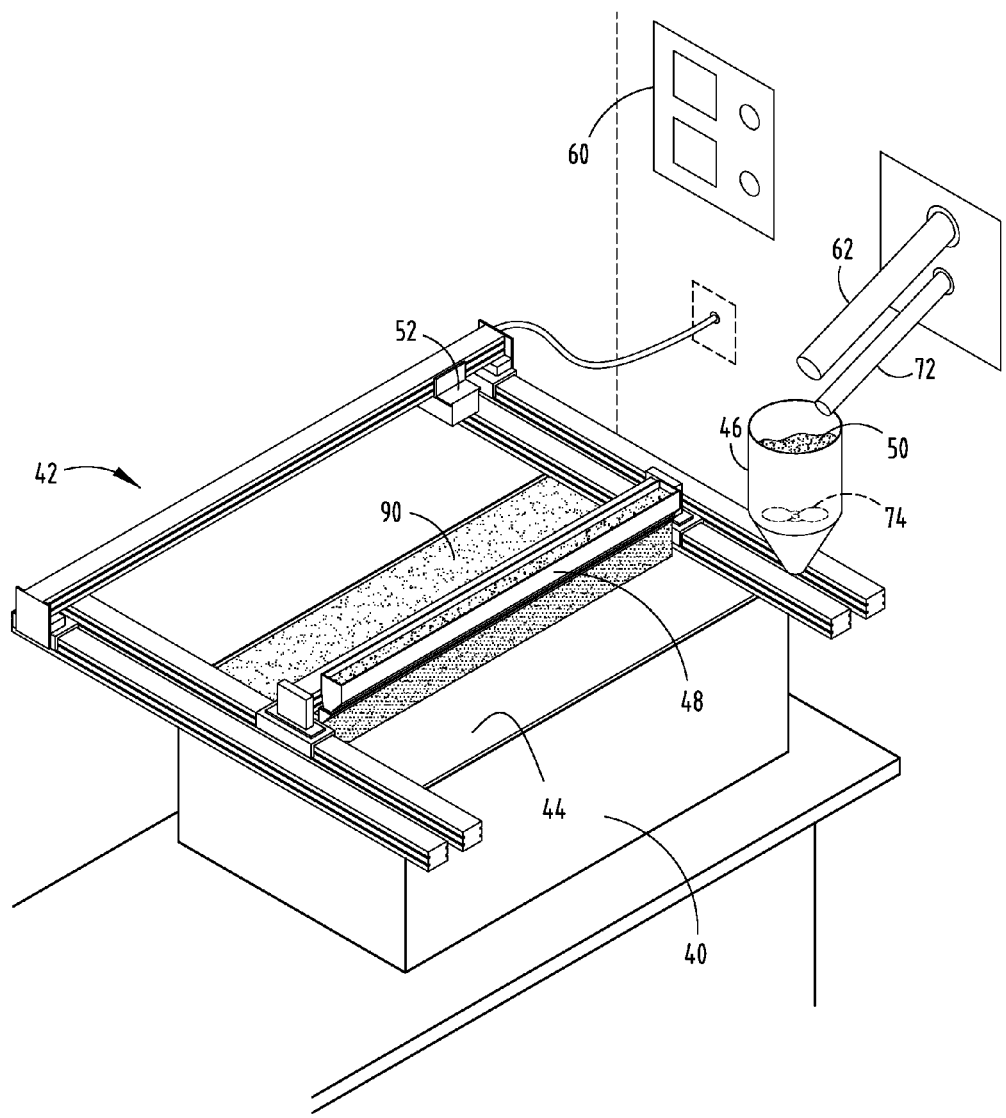
FIG. 2 is a top perspective view of the rigid containment box of FIG. 1 during the spreading of the first layer of fine particulate in the rigid containment box.
Figure 3:
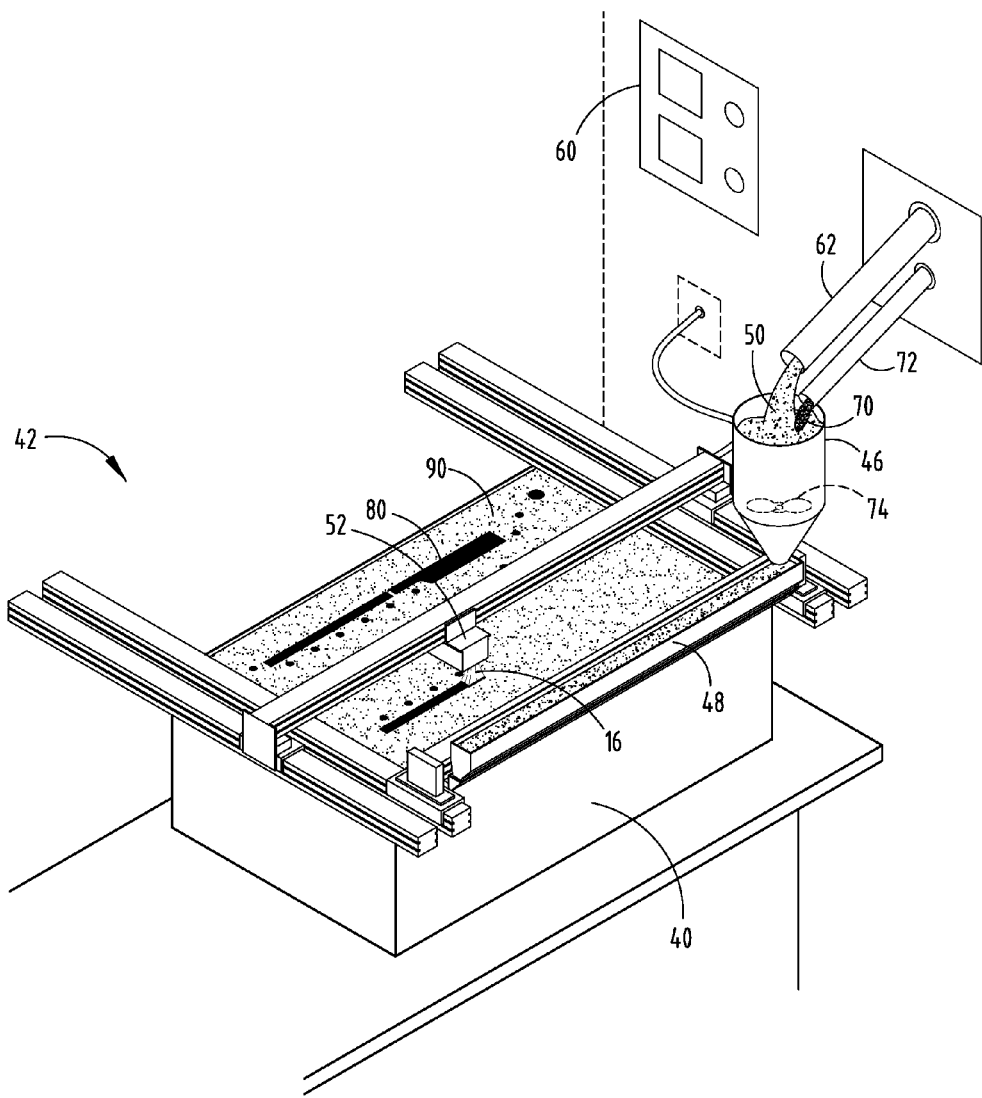
FIG. 3 is a top perspective view of the rigid containment box of FIG. 1 after several passes of a sandprinting device.
Figure 4:
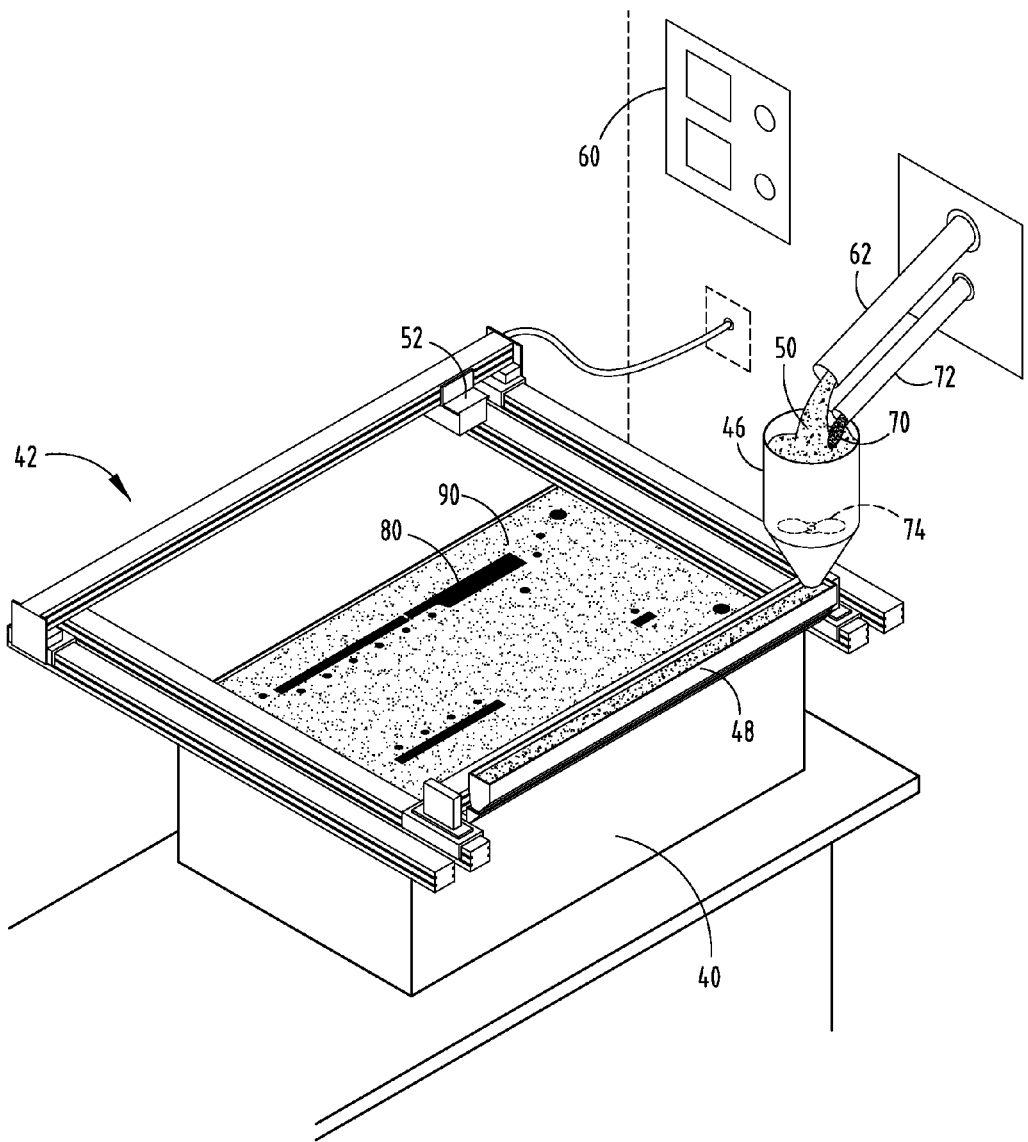
FIG. 4 is a top perspective view of the rigid containment box of FIG. 1 just before a fresh layer of fine particulates is to be spread over the print surface of the rigid containment box.
Figure 5:
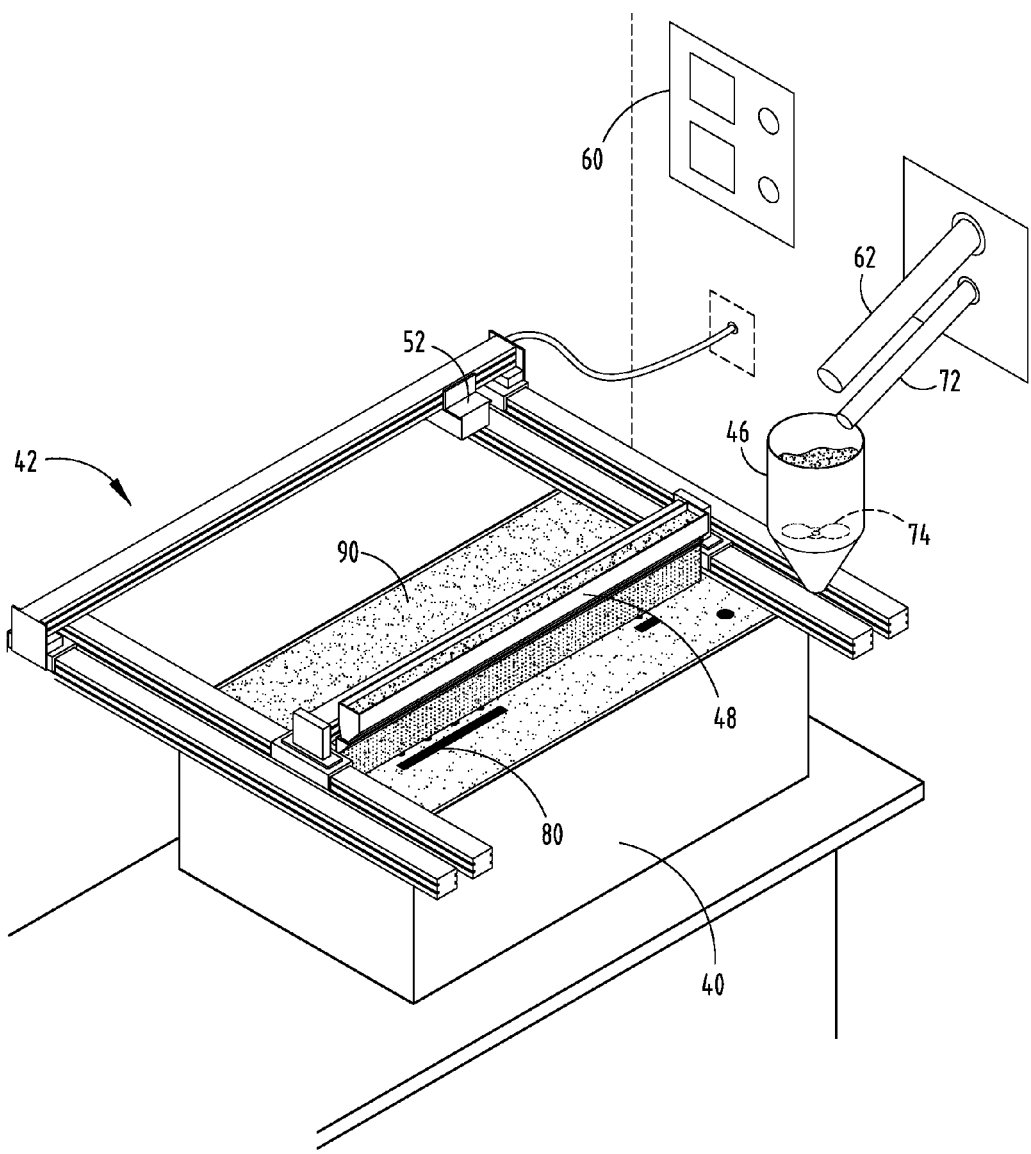
FIG. 5 is a top perspective view of the rigid containment box of FIG. 1 with a fresh layer of fine particulate being spread over the print surface of the rigid containment box.
Figure 6:
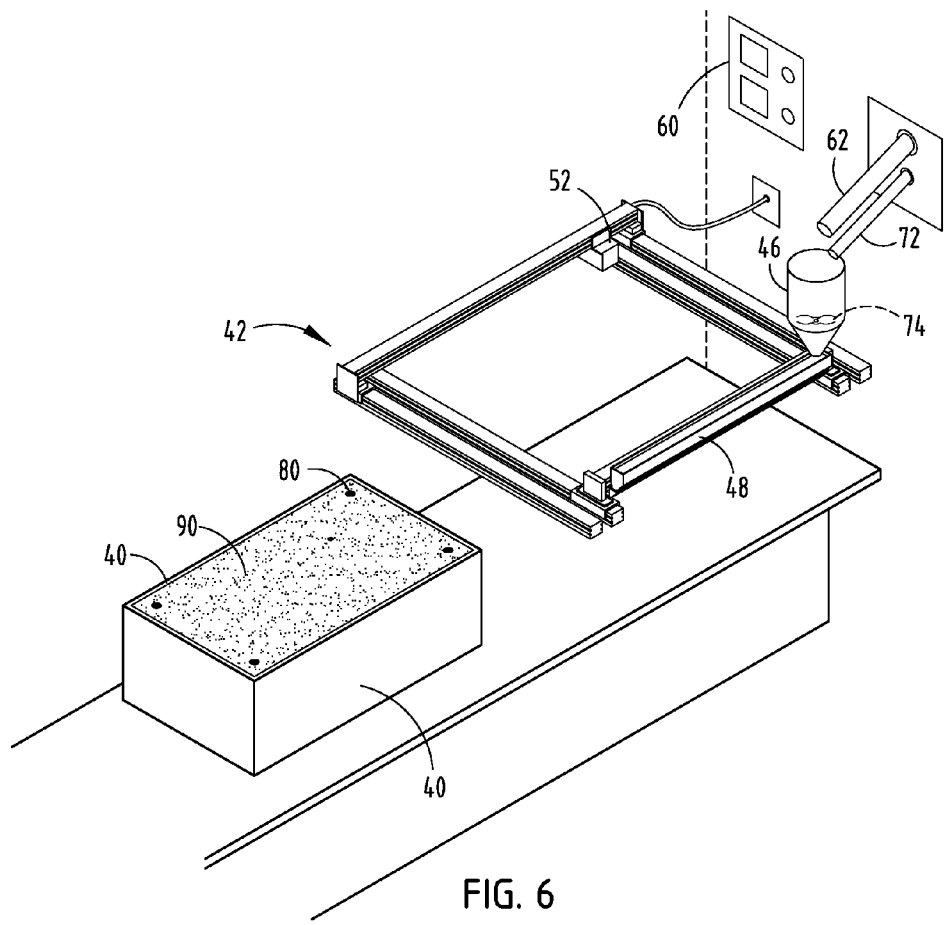
FIG. 6 is a top perspective view of the rigid containment box of FIG. 1 after a full mold core has been printed in the rigid containment box.
Figure 6A:
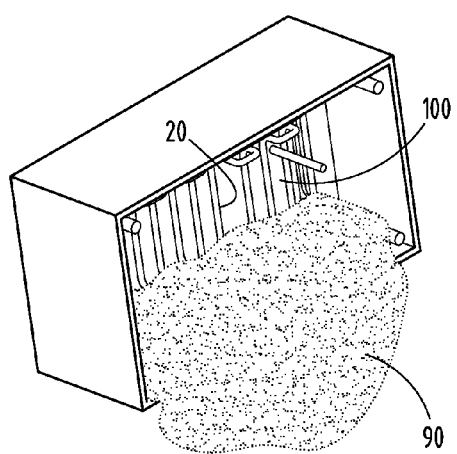
FIG. 6A is a side perspective view of the rigid containment box of FIG. 1 containing the mold cores with excess unbound sand being removed.

Referring now to FIGS. 2 and 3, after the fine particulates 50 have been moved to the deposition trough 48, the fine particulates 50 are spread across the print area 44 in a fine even layer by the deposition trough 48. After being spread in a thin layer on the print area 44 in the job box 40, the activated fine particulates 50 are sprayed with the binding agent 16. The binding agent 16 comes from the binder dispenser 52, which sprays a thin layer of the binding agent 16 in a pattern 90 that represents a first thin cross-sectional layer of the desired mold core package 10 (FIG. 8). After the binding agent 16 has been sprayed, another mixture of fine particulates 50 and activator 70 is prepared and dumped into the deposition trough 48. The deposition trough 48 then dispenses another layer of activated fine particulates 50 over the previously spread fine particulates 50 layer in the job box 40. The binder dispenser 52 passes over the print area 44 again, spraying a thin layer of the binding agent 16 in the pattern 90 that represents a second thin cross-sectional layer of the desired mold core package 10 adjacent to the first thin cross-sectional layer. These steps are repeated many times until every cross-sectional layer of the mold core package 10 has been printed (FIG. 6). Using this mold core construction technique, virtually any shape of the mold core package 10 can be formed. Further, the mold core package 10 can have internal structural features that cannot otherwise be created by other known methods. Specifically, the mold core package 10 can be constructed to include the plurality of sacrificial particulate lines 20 (FIG. 6A) that extend in and around the mold core package 10. The plurality of sacrificial particulate lines 20 are created from the binding agent 16 and fine particulates 50 in the same way the mold core package 10 is formed. As will be disclosed in further detail herein, the plurality of sacrificial particulate lines 20 are used to define the conformal channels or lines 22 (FIG. 13), which allow for rapidly heating and cooling of the molding tool 12 (FIG. 13) during the injection molding of the parts.

Figure 7:
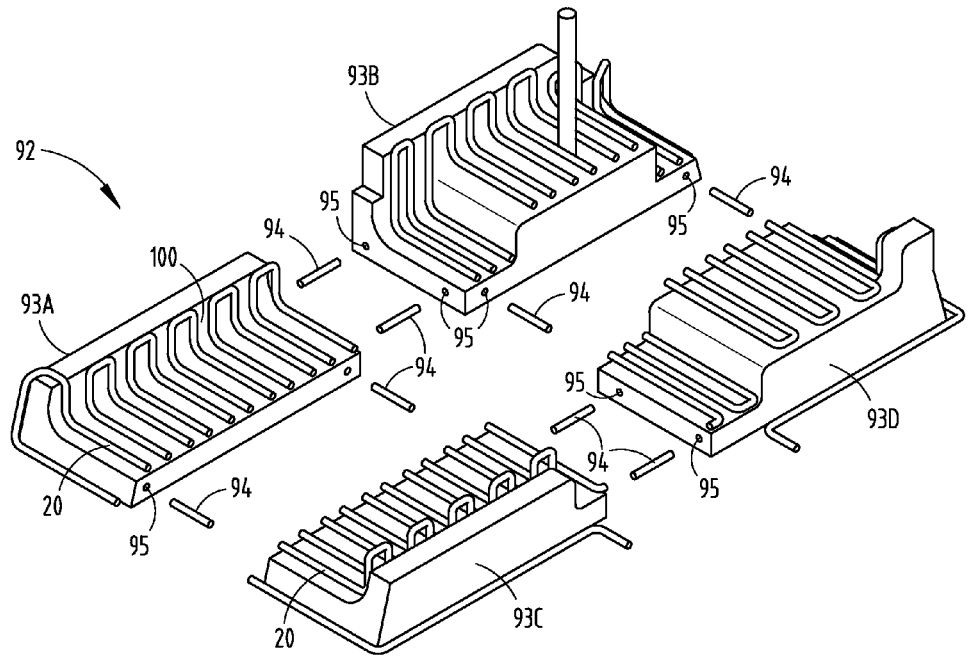
FIG. 7 is a top perspective view of unassembled mold components after being removed from the rigid containment box.
Figure 7A:
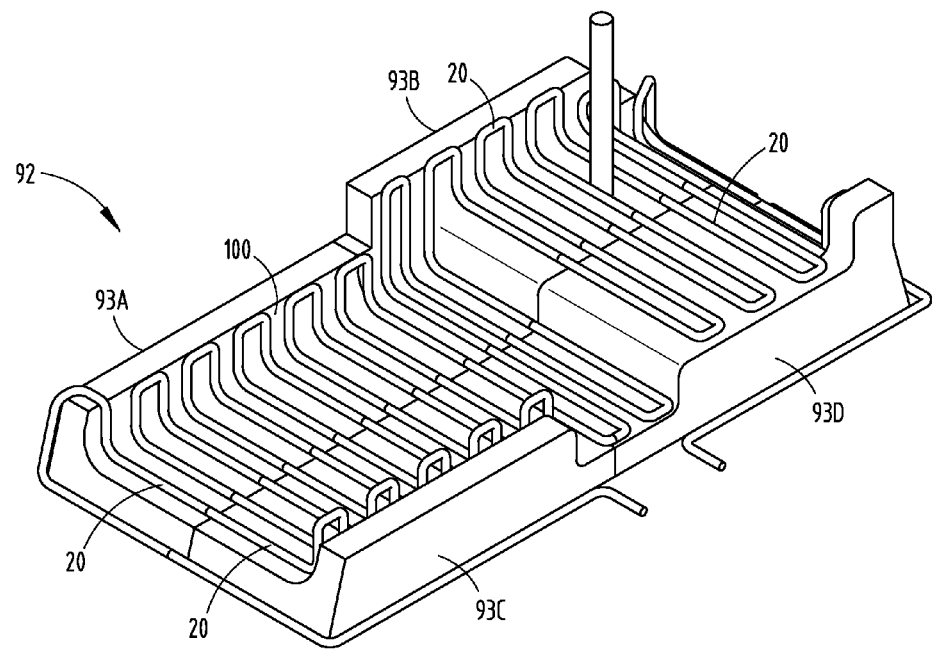
FIG. 7A is a top perspective view of the assembled mold core of FIG. 7.

Referring now to FIGS. 7 and 7A, it also contemplated that any of interlocking features for connecting components of a mold core package may be utilized. In the illustrated embodiment, a composite mold core 92 having a multitude of components of a mold core package 93A, 93B, 93C, and 93D adapted for insertion into a job box. In certain instances, when large molding tools 12 (FIG. 13) are being formed, several components of a mold core package may need to be fitted together to form the mold tools 12. As shown, the components of a mold core package 93A, 93B, 93C, and 93D are combined using sacrificial connectors 94 that are adapted to engage receiving slots 95 in each of the components of a mold core package 93A, 93B, 93C, and 93D. The components of a mold core package 93A, 93B, 93C, and 93D otherwise function similarly to the mold core package 10 discussed in this disclosure.

Figure 9:
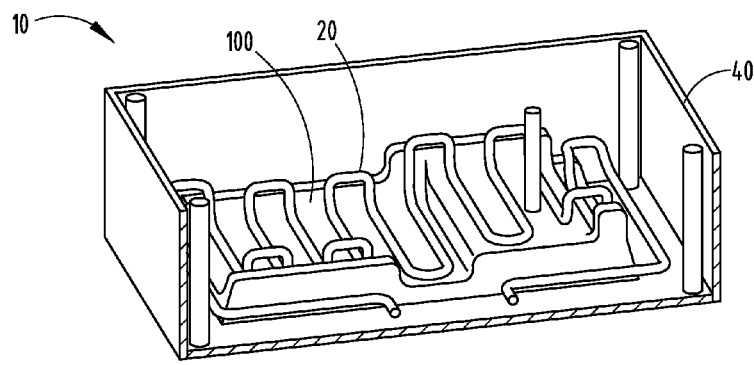
FIG. 9 is a top perspective cross-sectional view taken at line IX-IX of FIG. 8.
Figure 10:
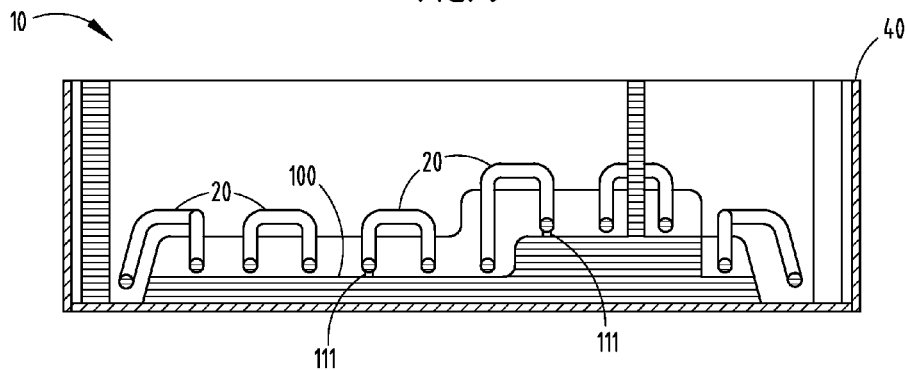
FIG. 10 is a side elevational cross-sectional view of the mold core package of FIG. 8 taken at line X-X.

As shown in FIGS. 8-11, the 3D mold core package 10 includes a forming surface 100 that generally represents the shape of a part that will ultimately be molded. The mold core package 10 also includes the plurality of sacrificial particulate lines 20 that define conformal lines 22 (FIG. 13) in the molding tool 12. The mold core package 10 also has a shape that includes the size and positioning of the conformal lines 22, which are elongate passageways through which heating and cooling fluids travel during formation of molded parts in the molding tool 12. At the same time, conformal lines 22 are disposed about a molding surface 160 (FIG. 13) of what will ultimately be the mold part. The conformal lines 22 assist with heating and cooling of the mold part during the molding process. As shown in FIGS. 9 and 10, the mold core package 10 is prepared for the introduction of a molten material 110. The molten material 110 may be any of a variety of metals, including cast iron or an alloy. Intermittently spaced core supports 111 may be disposed in the mold core package 10. The core supports 111 hold the sacrificial particulate lines 20 in place above the forming surface 100. Both the mold core package 10 and plurality of sacrificial particulate lines 20 are used one time to make one molding tool 12. That is, the mold core package 10 and the plurality of sacrificial particulate lines 20 are generally destroyed during creation of the molding tool 12 after the molten material 110 has solidified in the mold core package 10. An alloy, such as that shown and described in U.S. Provisional Patent Application No. 61/268,369, entitled "Method of Producing a Cast Skin or Slush Mold," and PCT International Publication No. WO 2010/144786, entitled "Low CTE Slush Molds with Textured Surface, and Method of Making and Using the Same," which are incorporated herein in their entirety, may be poured into the mold core package 10.

Figure 11:
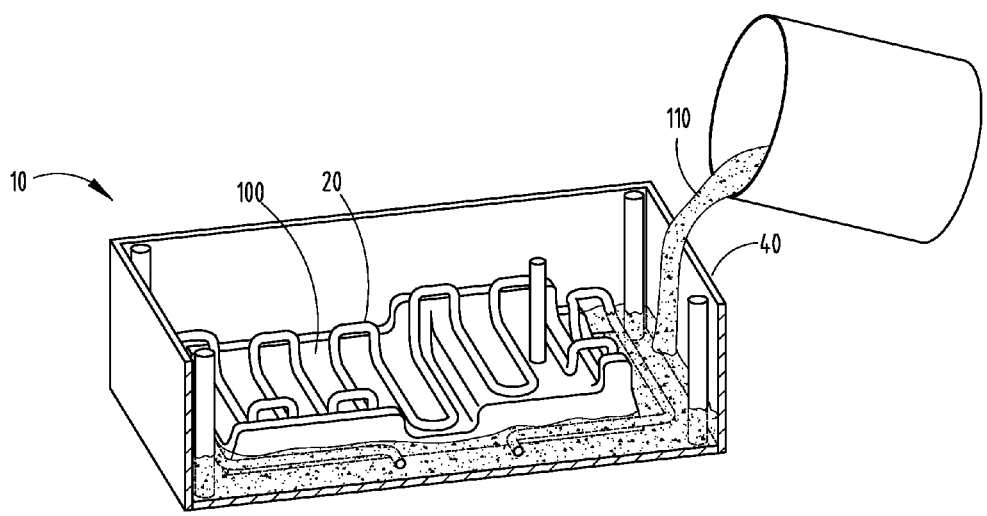
FIG. 11 is a top perspective cross-sectional view of a mold core package during filling of molten metal into a casting area defined by the mold core package.
Figure 12:
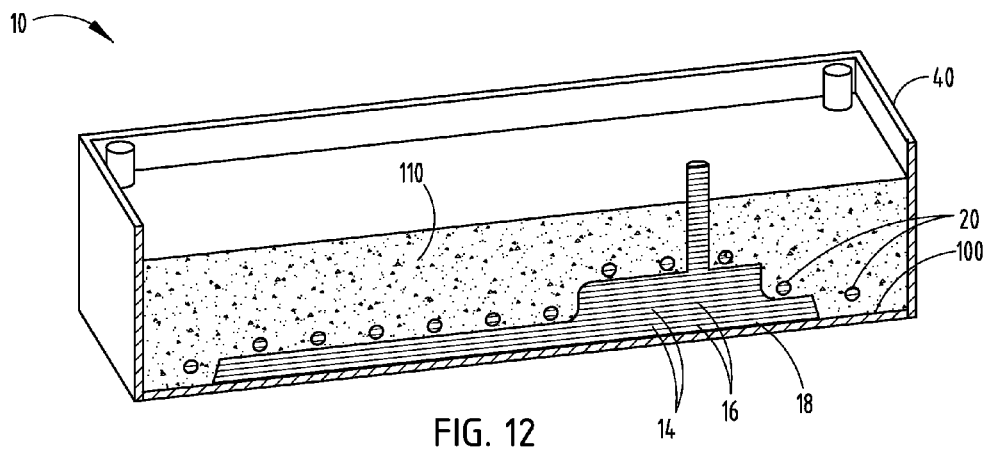
FIG. 12 is a top perspective cross-sectional view of formation of a mold core package after introduction of the molten metal to the mold core package.
Figure 12A:
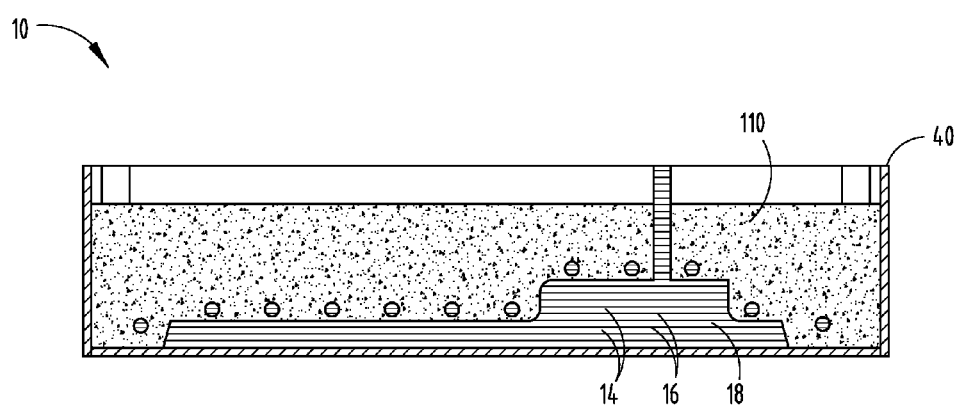
FIG. 12A is a side elevational cross-sectional view of the mold core package of FIG. 12.
Figure 13:
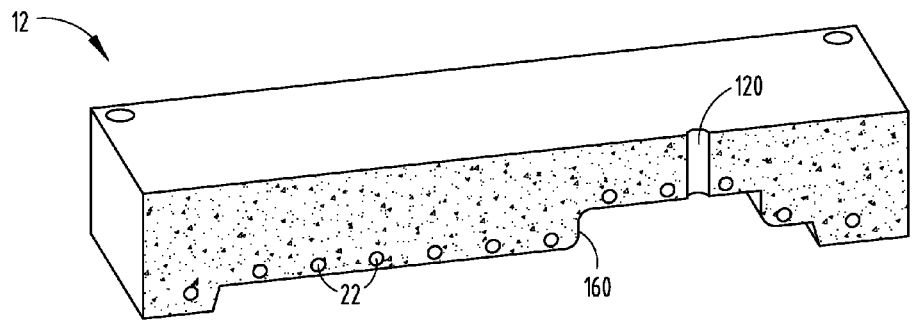
FIG. 13 is a top perspective view of the resulting molding tool formed from the mold core package.

Referring now to FIGS. 11-13, the molding tool 12 is made by pouring the molten material 110 into the mold core package 10. The molten material 110 fills all the empty space in and around the mold core package 10, sacrificial walls 18, and sacrificial particulate lines 20. The molten material 110 may incinerate some or all of the binding agent 16 in the thin particulate layers 14. After the insertion of the molten material 110 into the mold core package 10, the mold core package 10 is placed in a furnace where the heat volatilizes the binding agent 16 in the mold core package 10. The cast molding tool 12 is then broken away from the mold core package 10 by breaking up the sacrificial walls 18, and any remaining sand can be flushed or washed off the molding tool 12. Similarly, the binding agent 16 in the sacrificial particulates lines 20 also volatilizes such that the conformal lines 22 can be cleaned out with a brush or a power-sprayer that washes the fine particulates 50 out of the conformal lines 22.

Further, it is contemplated that thin containment walls can be printed around the mold core package, such as mold core package 10 shown in FIG. 11. It is contemplated that the thin containment walls can largely mirror the configuration of the job box 40 shown in FIG. 11. It is possible to print the thin containment walls using the sandprinting process noted above as the mold core package 10 is also printed. A molten material, such as the molten material 110 noted above, can be cast within the thin containment walls printed about the mold core package 10. In order for the thin containment walls to withstand the casting process, a mold core package having thin containment walls printed around the mold core package would be nested into foundry sand for added support. In this way, an additive manufacturing technique can be used to provide containment walls for containing and forming a cast part when supported by foundry sand. Further, a similar technique of printing protective thin containment walls can be used to completely surround a very delicate and intricate mold core package. In this way, it is contemplated that a protective thin wall containment structure can be printed, which completely surrounds a delicate mold core package to protect the mold core package until it is needed for a casting process. The protective thin wall structure can then be broken away to allow the casting operator to retrieve the mold core package.

As shown in FIGS. 12-13, the molten material 110 is then allowed to harden. The molten material 110 hardens to form the molding tool 12. After hardening, the mold core package 10 is destroyed and internal voids are cleared out. After the molding tool 12 has been scrubbed and properly treated, the finished molding tool 12 that is left is capable of forming molded parts during injection molding or other molding processes. The molding tool 12 includes an injection port 120 for injecting a molding material 122 (FIG. 15B) into the mold cavity 26 (FIG. 16A) defined between opposing molding tools 12. In addition, it will be noted that the conformal lines 22 are provided in the molding tool 12. The molding tool 12 only represents one-half of a molding assembly 130 (FIG. 16A), which includes two molding tools 12 that operate as first and second mold halves 132, 134 (FIG. 16A) that are used for forming a mold part 140.

Figure 14A:
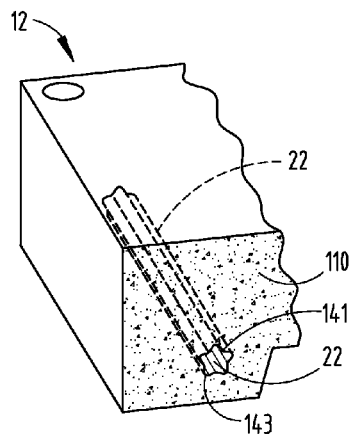
FIG. 14A is a top perspective cross-sectional view of one embodiment of a conformal line construction extending through a molding tool.
Figure 14B:
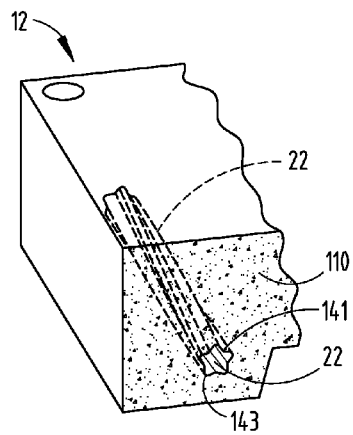
FIG. 14B is a top perspective cross-sectional view of another embodiment of a conformal line extending through a molding tool.
Figure 14C:
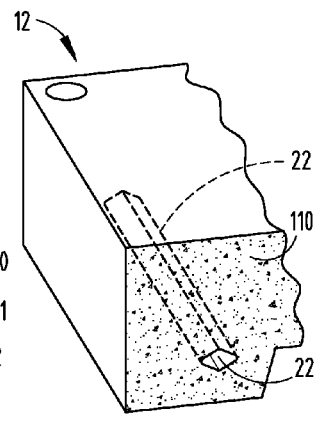
FIG. 14C is a top perspective cross-sectional view of another embodiment of a conformal line extending through a molding tool.
Figure 14D:
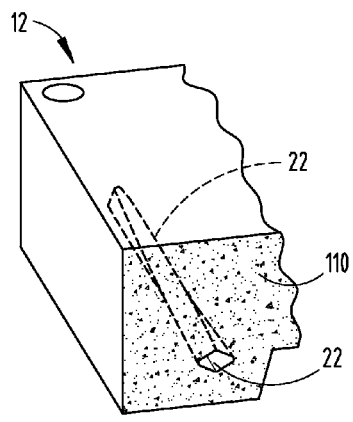
FIG. 14D is a top perspective cross-sectional view of another embodiment of a conformal line extending through a molding tool.
Figure 14E:
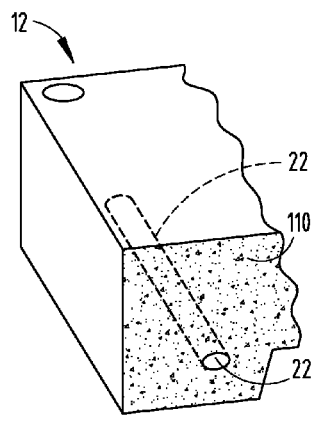
FIG. 14E is a top perspective cross-sectional view of another embodiment of a conformal line extending through a molding tool.
Figure 14F:
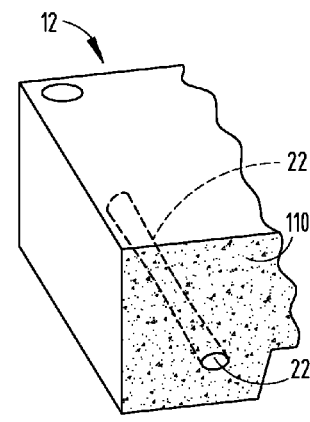
FIG. 14F is a top perspective cross-sectional view of another embodiment of a conformal line extending through a molding tool.
Figure 14G:
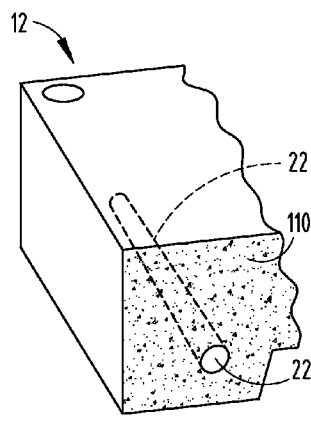
FIG. 14G is a top perspective cross-sectional view of another embodiment of a conformal line extending through a molding tool.
Figure 14H:
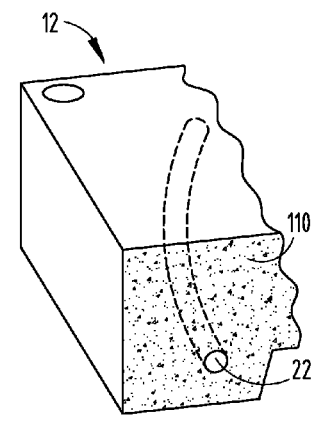
FIG. 14H is a top perspective cross-sectional view of another embodiment of a conformal line extending through a molding tool.
Figure 14I:
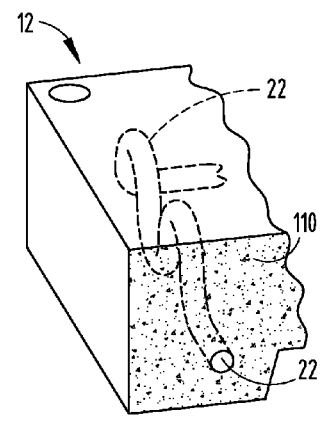
FIG. 14I is a top perspective cross-sectional view of another embodiment of a conformal line extending through a molding tool.

Referring now to FIGS. 14A-14H, the sacrificial particulate lines 20 (FIG. 12) can be formed with various protuberances that define irregular shapes in the conformal lines 22 after application of molten material to the mold core package 10. Accordingly, the conformal lines 22 may include a variety of configurations and features, such as turbulence inducing members. As illustrated in FIG. 14A, the conformal lines 22 include a multitude of fins 141 that define recesses 143 in the molding tool 12. The recesses 143 can provide desired thermodynamic characteristics that efficiently convey heat to molding material 110 prior to the molding process, or withdraw heat from an already formed part. In another embodiment, as shown in FIG. 14B, the fins 141 and recesses 143 are constructed in a spiral pattern, which can create additional turbulence in the conformal line 22 when the molding tool 12 is being heated or cooled. Similar embodiments, such as those shown in FIGS. 14C-14F include a diamond-shaped construction (FIG. 14C), a diamond-shaped construction that is in a spiral configuration (FIG. 14D), an ovular construction (FIG. 14E), and an ovular construction that is in a spiral configuration (FIG. 14F). Additionally, the diameter of the conformal line 22 may also change, such that flow through the molding tool 12 increases or decreases as the warming/cooling fluid passes through the conformal lines 22 (FIG. 14G). These and other variations on the conformal lines 22 are possible as a result of the manufacturing of the molding tool 12 using a mold core package that is made by way of the 3D printing process detailed herein. Traditional cooling lines for molding tools were frequently drilled, thus eliminating the possibility of irregularly shaped conformal lines 22. Additionally, as shown in FIG. 14H, it is contemplated that the longitudinal extent of the conformal lines 22 may be linear, arcuate, angled, etc. Moreover, the conformal lines 22 can be undulated and include portions that are very close to the molding surface 160 (FIG. 15A) and other portions that are not close to the molding surface 160, such that different areas of the conformal lines 22 have a different thermal influence on the molding tool 12 and ultimately the part that will be molded. As noted herein, these configurations are made possible by the 3D printing process detailed herein.

Figure 15A:
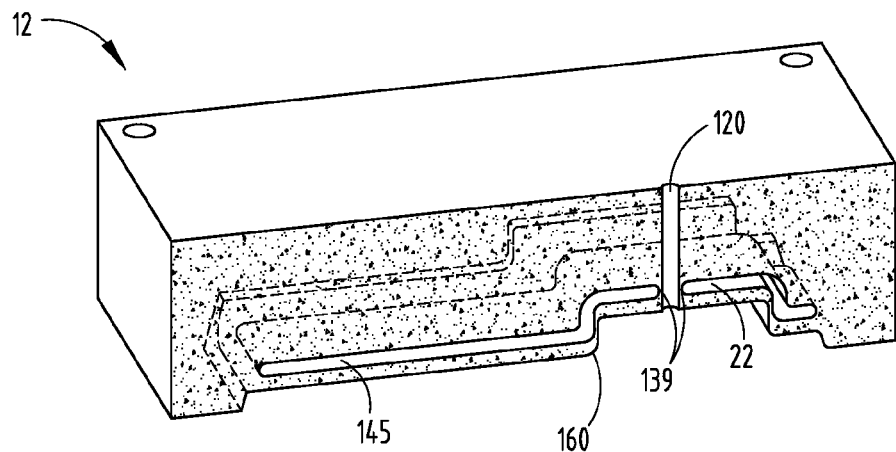
FIG. 15A is a top perspective cross-sectional view of one embodiment of a conformal reservoir extending through a molding tool.
Figure 15B:
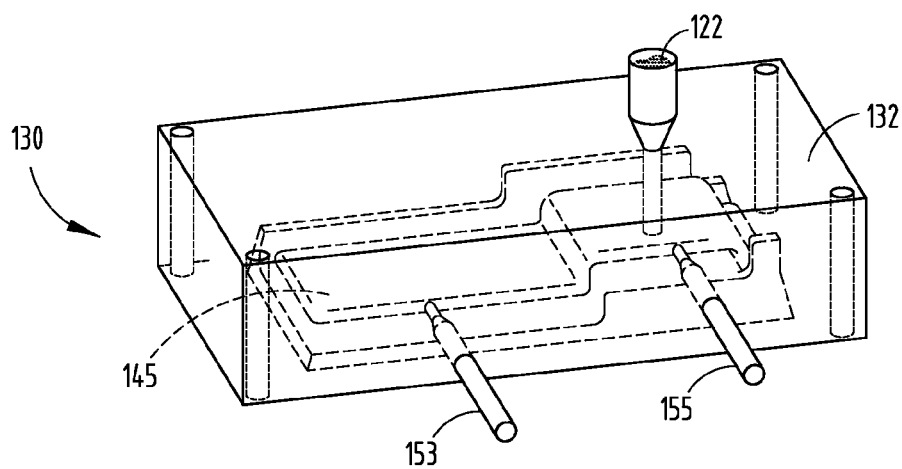
FIG. 15B is a top perspective view of the conformal reservoir and molding tool of FIG. 15A.
Figure 15C:
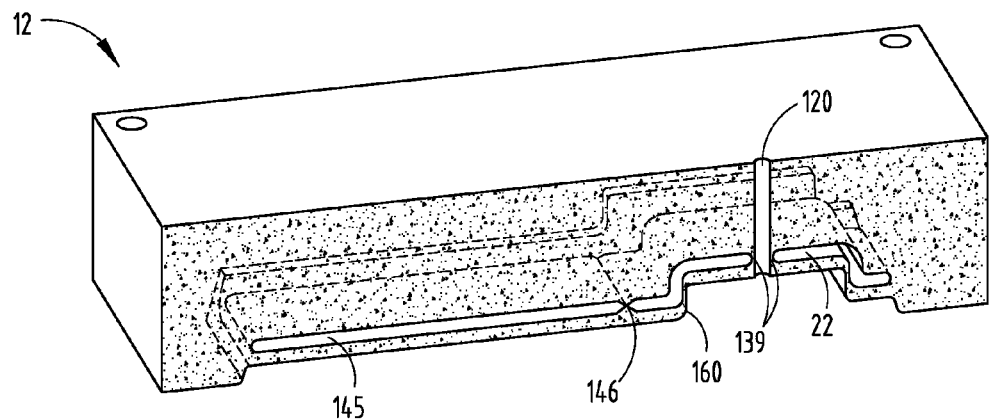
FIG. 15C is a top perspective cross-sectional view of another embodiment of a conformal reservoir extending through a molding tool.
Figure 15D:
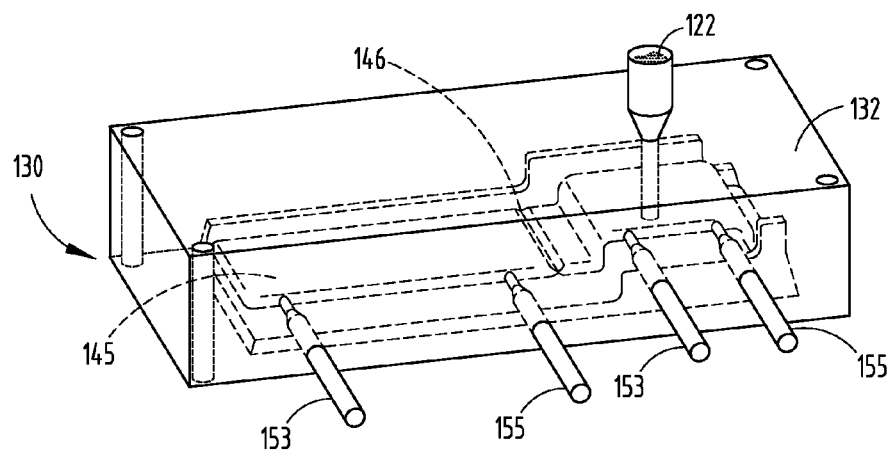
FIG. 15D is a top perspective view of the conformal reservoir and molding tool of FIG. 15C.

Referring now to FIGS. 15A-15D, it is contemplated that the conformal lines 22 may communicate with or become part of one or more conformal reservoirs 145. Each conformal reservoir 145 is formed from a sacrificial displacement body that is formed with the mold core package 10 during construction of the mold core package 10. The sacrificial displacement body can include various recesses that define irregular shapes in the conformal reservoirs 145 after application of molten material to the mold core package 10. The conformal reservoirs 145 are adapted to provide uniform flow of heating/cooling fluid through the molding tool 12 proximate the molding surface 160 defined in the molding tool 12. The molding tool 12 may include multiple conformal reservoirs 145 that extend across the molding tool 12. As shown in FIGS. 15C and 15D, periodic columns 146 are provided that are designed to withstand loads on the molding tool 12 associated with injection molding pressures. The periodic columns 146 ensure that the injection molding tool 12 does not break or crack near any of the conformal reservoirs 145. Additionally, the molding tool 12 includes separation walls 139 that prevent molding material that is injected into the mold cavity 26 (FIG. 16A) from entering the conformal reservoir 145 or conformal lines 22.

The conformal reservoirs 145 may take on a variety of constructions and may be located at various distances from the molding surface 160, depending on the desired thermal influence the conformal lines 22 have on the molding tool 12 and ultimately the part to be molded. Additionally, it is contemplated that the conformal reservoirs 145 may undulate throughout the molding tool 12. More specifically, portions of the conformal reservoirs 145 may be closer to the molding surface 160 of the molding tool 12 than other portions of the conformal reservoirs 145, thus providing areas that have higher thermal influence on the molding surface 160 than those areas of the conformal reservoirs 145 that are farther from the molding surface 160.

Figure 15E:
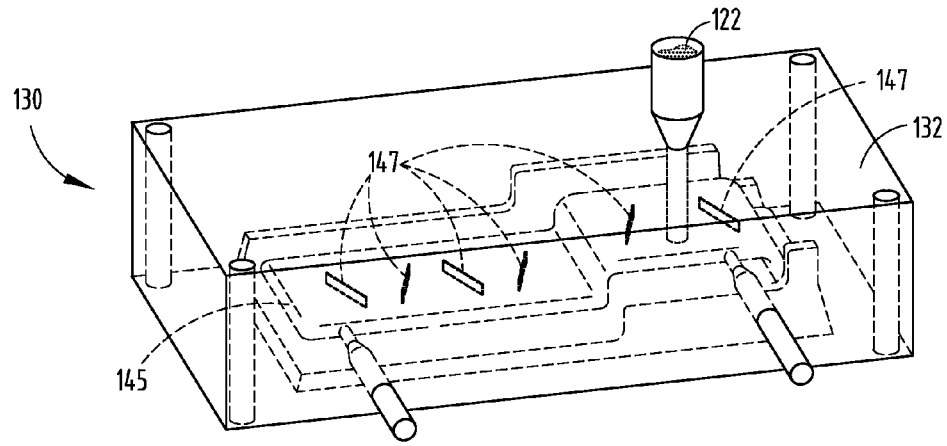
FIG. 15E is a top perspective view of another embodiment of a conformal reservoir extending through a molding tool.
Figure 15F:
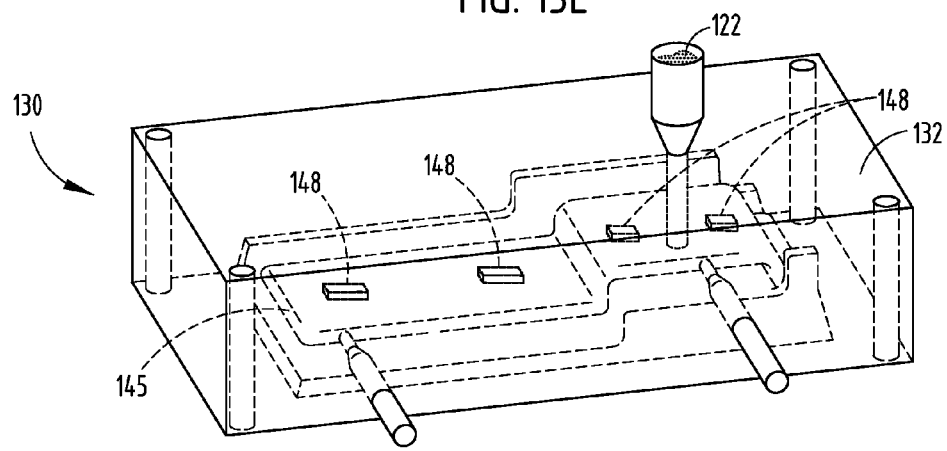
FIG. 15F is a top perspective view of yet another embodiment of a conformal reservoir extending through a molding tool.
Figure 15G:
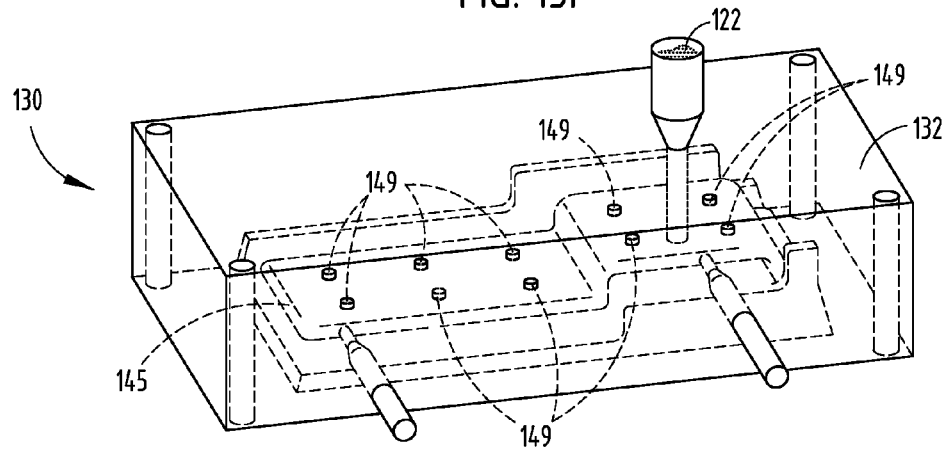
FIG. 15G is a top perspective view of yet another embodiment of a conformal reservoir extending through a molding tool.

Referring now to FIGS. 15E-15G, various turbulence inducing members may be disposed inside the conformal reservoirs 145 to limit stagnation and improve turbulence of the heating/cooling fluid that flows through the part during the injection molding process. As shown in FIG. 15E, a number of fins 147 are disposed at angles relative to one another and that encourage flow into and around the fins 147. Alternatively, as shown in FIG. 15F, a plurality of baffles 148 are disposed at intermittent positions inside the conformal reservoir 145, which act to influence the flow of the heating/cooling fluid flowing through the conformal reservoir 145, and also minimize thermal influence of the heating/cooling fluid at the locations of the baffles 148. In yet another embodiment, as shown in FIG. 15G, a plurality of intermittent projections 149 extend into the conformal reservoir 145, thereby influencing flow and stagnation of heating/cooling fluid in the conformal reservoir 145. Although the projections 149 illustrated include a cylinder-shaped construction, it will be understood that the projections 149 could take on many different shapes. It will also be understood by one having ordinary skill in the art that any of a variety of different architectures can be formed in the molding tool 12 as a direct consequence of being constructed from the 3D printing process disclosed herein. During the molding process, the turbulence members are defined by a recess in the mold core that is later filled by the molten material during fabrication of the molding tool 12.

Figure 16:
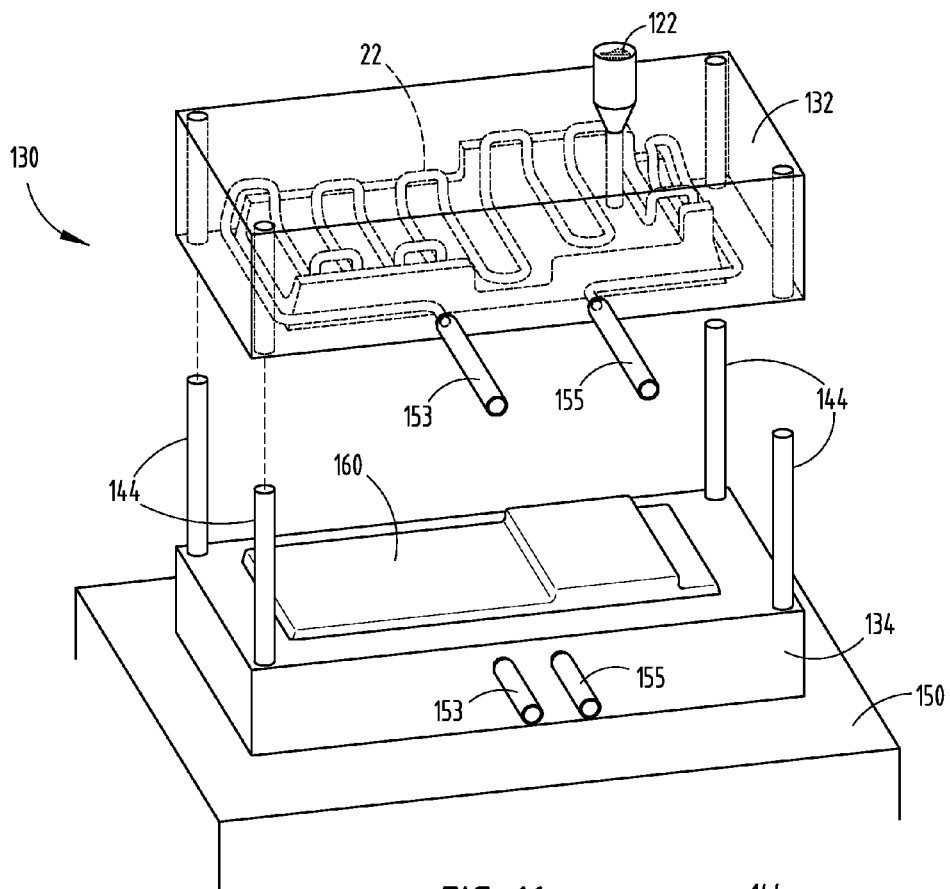
FIG. 16 is a top perspective view of the molding tool, which represents a first mold half, prior to connection with a complementary second mold half.
Figure 16A:
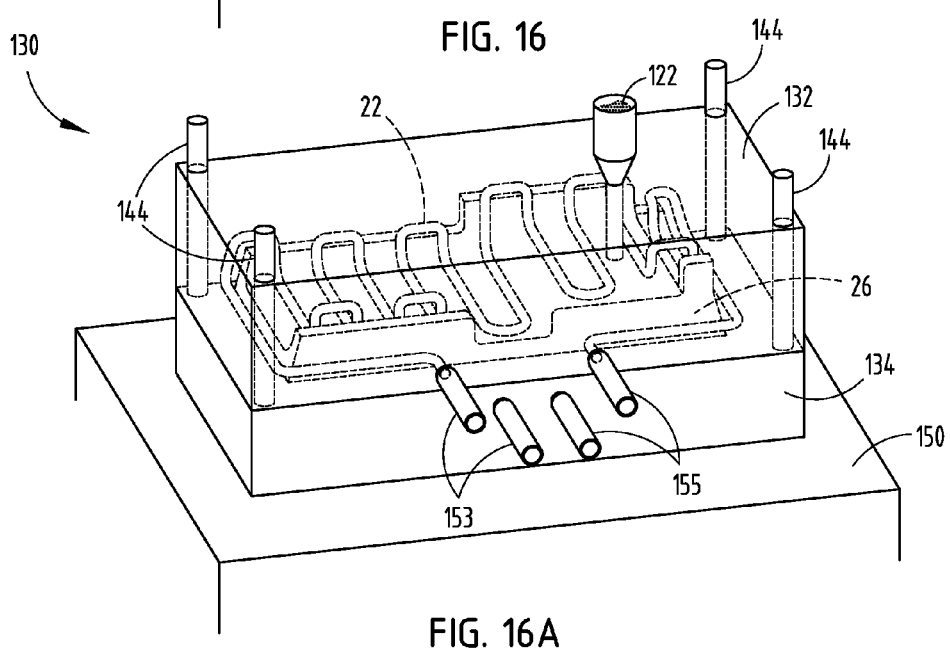
FIG. 16A is a top perspective view of the first mold half and second mold half of FIG. 16 after connection.
Figure 17:
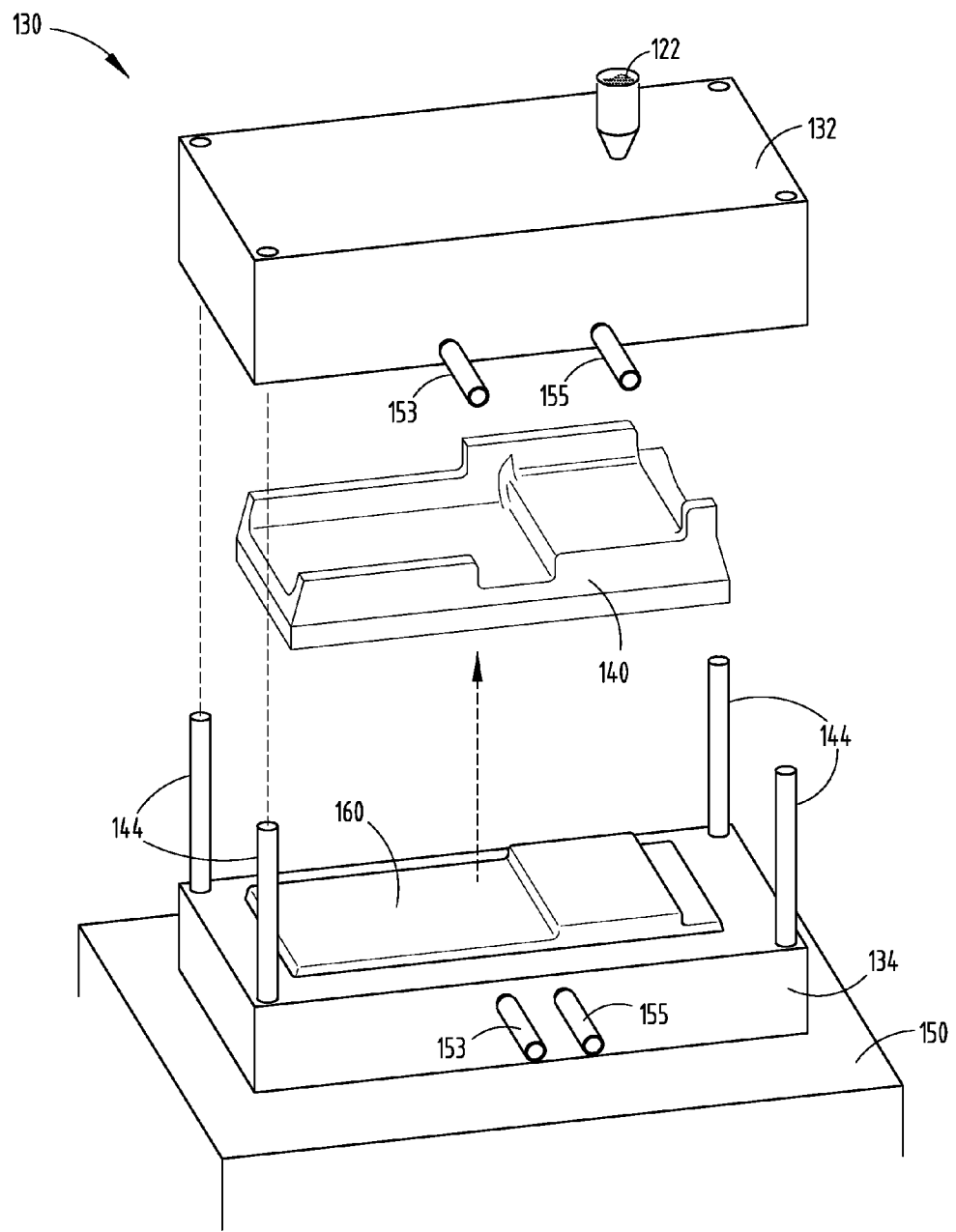
FIG. 17 is a top perspective view of a molded part being removed from the first mold half and second mold half.

Referring now to FIGS. 16 and 16A, a first mold half 132 is connected with a second mold half 134 that was previously formed and is complementary in shape. The first mold half 132 and the second mold half 134 represent molding tools 12 formed using the printing technique described in detail with reference to FIGS. 1-14. The mold cavity 26 between the first mold half 132 and the second mold half 134 represents the shape of the mold part 140 (FIG. 17) that is to be formed. The first mold half 132 and the second mold half 134 are connected via pins 144 disposed about corners of each of the first and second mold halves 132, 134 and which secure the first mold half 132 and the second mold half 134 laterally (X and Y directions). At the same time, a press 150 secures the first mold half 132 to the second mold half 134 in a vertical direction. After the first mold half 132 and the second mold half 134 have been secured together, the molding material 122 is injected through the injection port 120 at a high pressure. Consequently, the mold cavity 26 defined between the first mold half 132 and the second mold half 134 is filled with the molding material 122. At the same time, a heating fluid 152 (FIGS. 24 and 25) is pumped into an inlet 153 through the conformal lines 22, which are disposed proximate the molding surface 160 of the first mold half 132 and the second mold half 134 and leaves through an outlet 155. The heating fluid 152 warms the molding surface 160 of the first mold half 132 and the second mold half 134, causing proper flow of the molding material 122 into the mold cavity 26. After the mold cavity 26 has been completely filled with molding material 122, the conformal lines 22 are drained of the heating fluid 152. The conformal lines 22 are then filled with a cooling fluid 154 to rapidly cool the molding material 122 disposed in the mold cavity 26. It is contemplated that the cooling fluid 154 and heating fluid 152 may be the same fluid. Alternatively, the cooling fluid 154 may be a first fluid that operates well in a chilled condition, and the heating fluid 152 may be a second fluid that operates well in a heated condition. After a predetermined length of time, the first mold half 132 is separated from the second mold half 134 and the mold part 140 (FIG. 17) is removed. The first mold half 132 and the second mold half 134 are now ready for reconnection and introduction of additional molding material 122 to form more mold parts 140.

Figure 18:
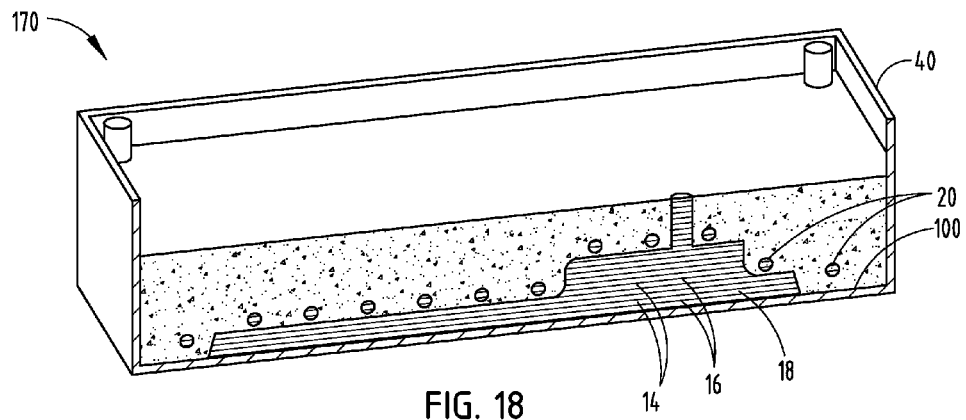
FIG. 18 is a top perspective cross-sectional view of formation of an insert mold tool in a mold core package.
Figure 19:
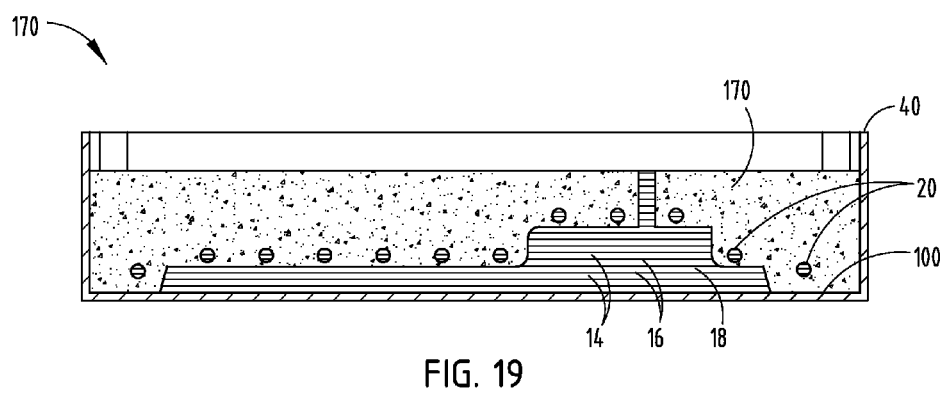
FIG. 19 is a side elevational cross-sectional view of the insert mold tool of FIG. 18.
Figure 20:
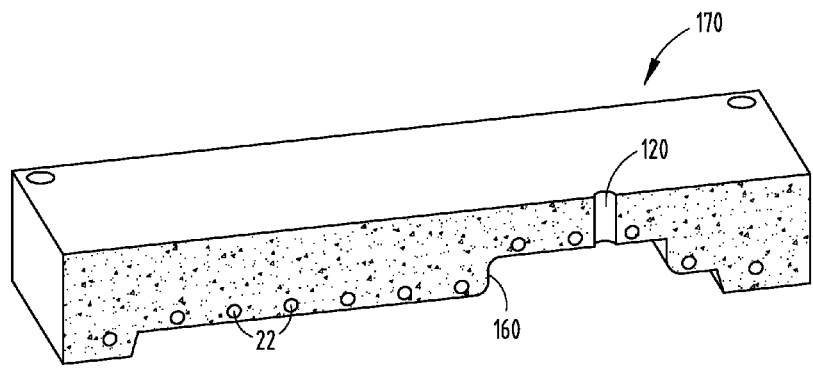
FIG. 20 is a top perspective cross-sectional view of the insert mold tool after removal from the mold core package.

Yet another embodiment of the present invention includes an insert molding assembly 168 (FIG. 21) that has first and second insert molds 170, 172, also known as a cavity tool 170 and a core tool 172, adapted to engage first and second base molds 174, 176, respectively. As illustrated in FIGS. 18-20, the first and second insert molds 170, 172 are formed in a similar process, as outlined above with respect to FIGS. 1-14. The same 3D printing process is utilized, but the 3D printing process is used to form first and second insert molds 170, 172 rather than the finished molding tool 12. The first and second insert molds 170, 172 provide for quick connection to the first and second base molds 174, 176, thereby allowing a user to quickly change out the first and second insert molds 170, 172 from the first and second base molds 174, 176, thereby improving the rate at which different mold parts 140 can be made in a molding facility. Conformal lines 22 and conformal reservoirs 145 can be formed in either or both of the insert molds 170, 172. It is also contemplated that the conformal lines 22 may be in fluid communication with conformal lines 22 in the first and second base molds 174, 176 or with relay lines in the first and second base molds 174, 176. The conformal lines 22, conformal reservoirs 145 and any relay lines are fabricated by forming sacrificial core portions, such as sacrificial displacement lines and sacrificial displacement bodies in a mold core package 10 prior to introduction of molten material to the mold core package 10.

Figure 21:
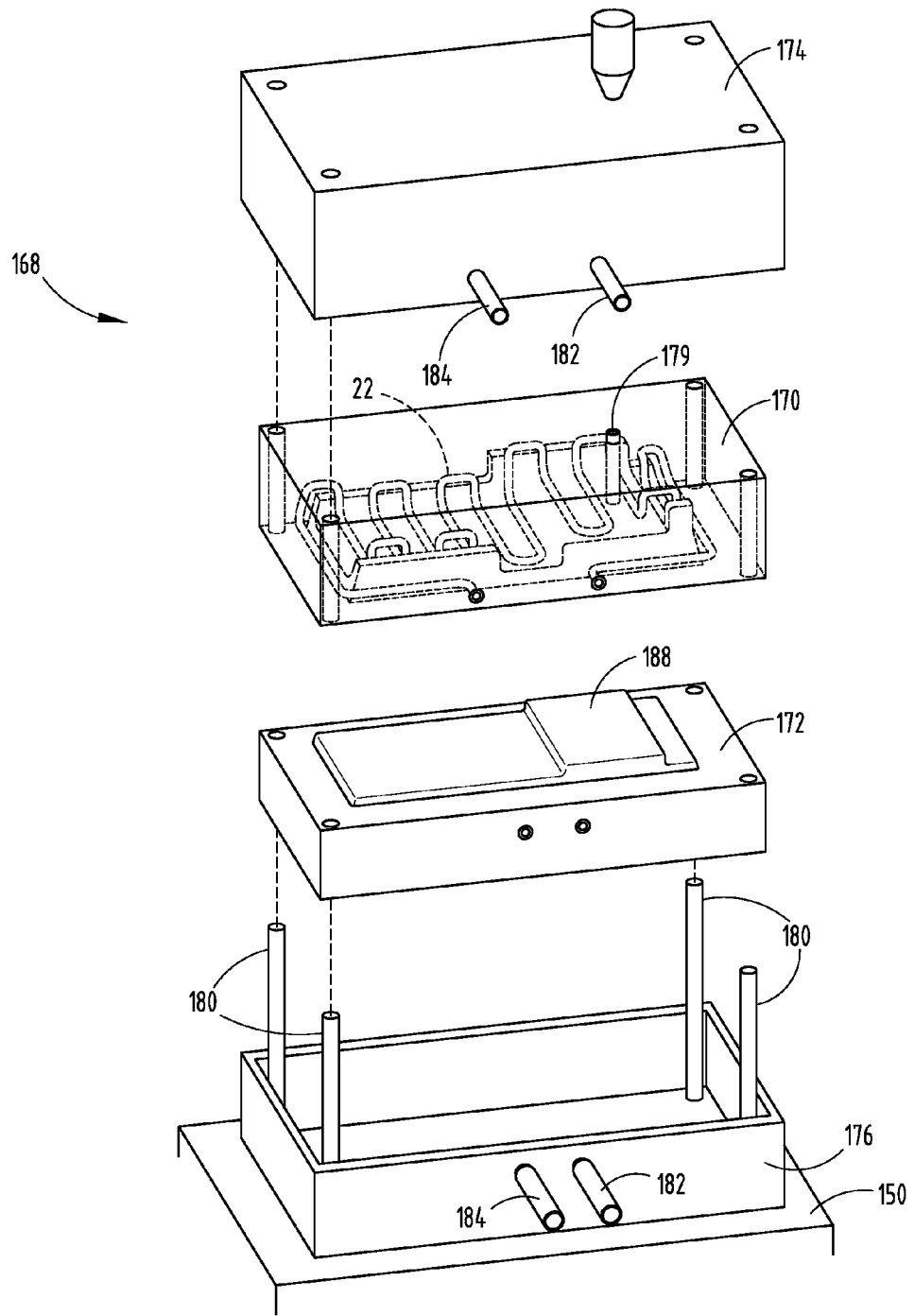
FIG. 21 is a top perspective view of the first and second insert mold tools prior to installation into first and second base molds.
Figure 21A:
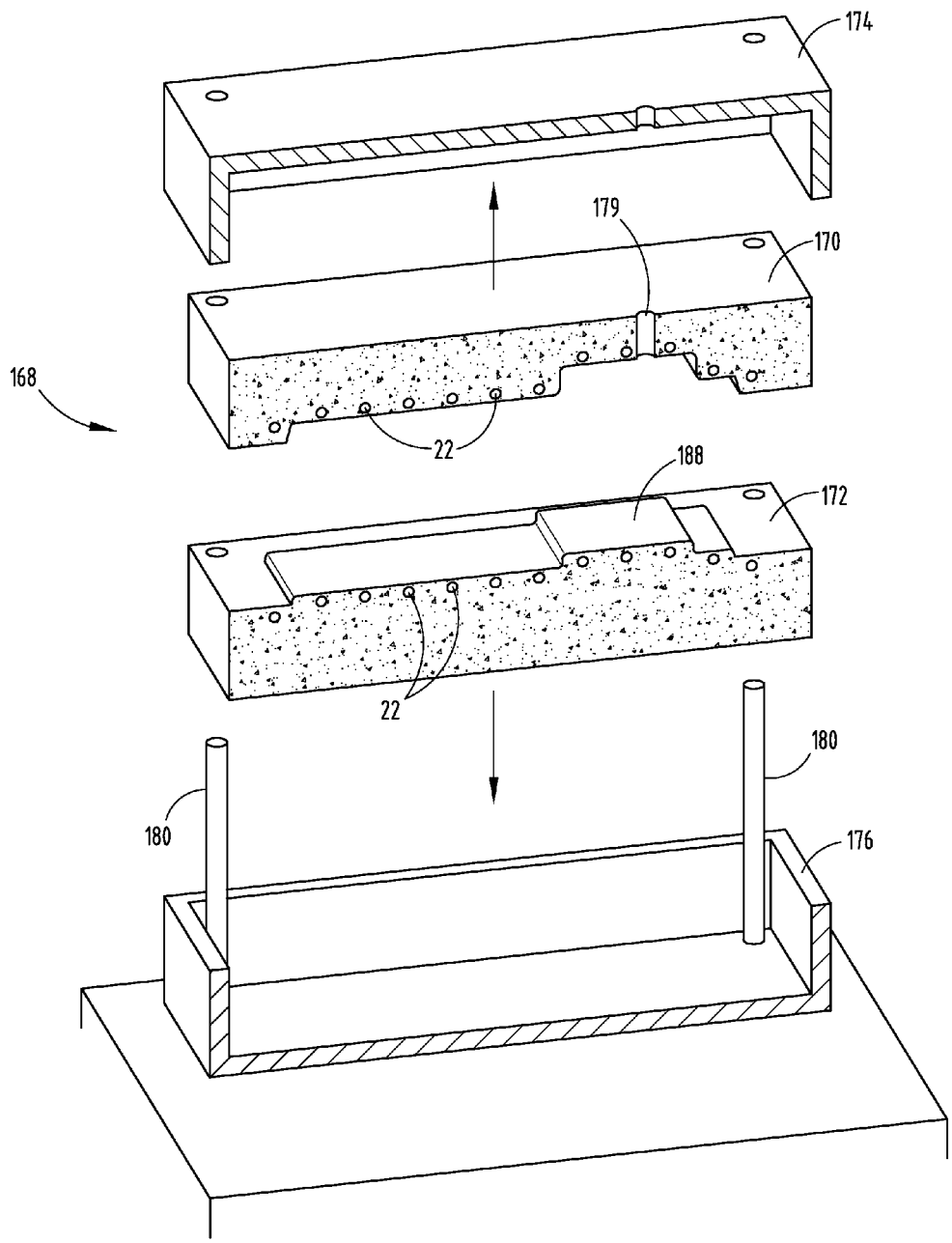
FIG. 21A is a top perspective cross-sectional view of the molding assembly of FIG. 21.
Figure 22:
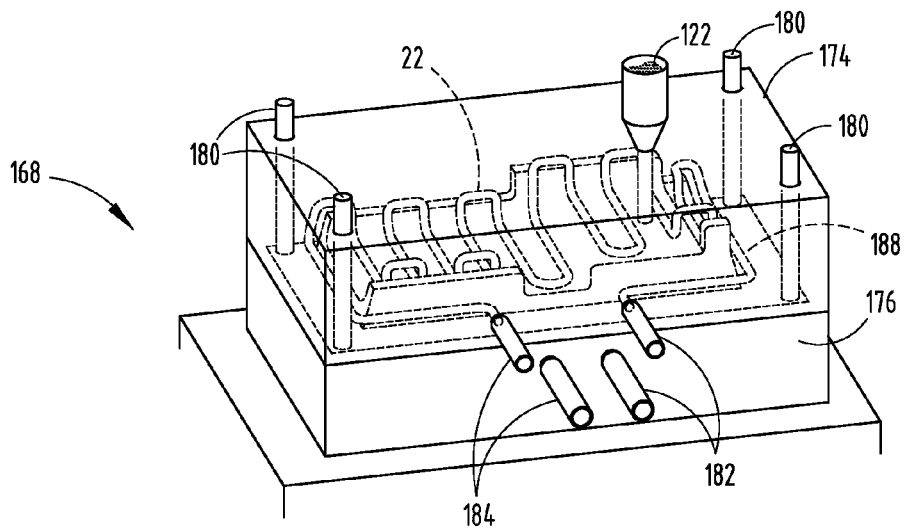
FIG. 22 is a top perspective view of the molding assembly of FIG. 21 during molding of a part.
Figure 23:
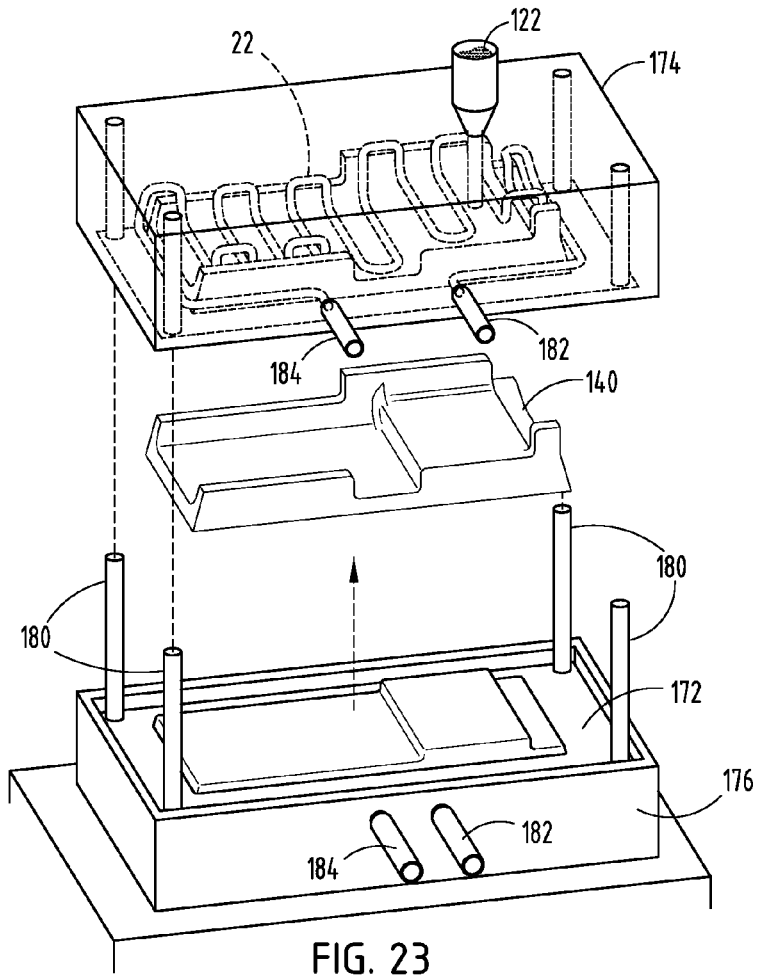
FIG. 23 is a top perspective view of the molding assembly of FIG. 21 during removal of the molded part.

As illustrated in the embodiment of FIGS. 21-23, the first and second insert molds 170, 172 are designed for insertion into the first and second base molds 174, 176, respectively. The first and second insert molds 170, 172 are aligned with pins 180 disposed about corners of the first and second base molds 174, 176. While the pins 180 in the embodiment shown in FIGS. 21-23 are adapted to engage the first and second insert molds, 170, 172, the present invention is not thereby limited to this embodiment. The pins 180 function as a guide feature that can guide the inserts, the base molds, the inserts and the base molds, or the pins 180 can be removed entirely. The first base mold 174, first insert mold 170, second insert mold 172, and second base mold 176 are then securely connected and molding material 122 is inserted through an inlet port 179 into the first base mold 174 and through the first insert mold 170. The molding material 122 occupies the mold cavity 26 defined between the first insert mold 170 and the second insert mold 172. The molding material 122 is then heated via the conformal lines 22, which includes heating fluid 152 that is pumped into an inlet 182, through the conformal lines 22, and out an outlet 184 of a molding surface 188 of the first and second insert molds 170, 172. After the molding material 122 has been fully pressurized inside the mold cavity 26, cooling fluid 154 is inserted into the conformal lines 22 to rapidly cool or chill the molding material 122, thereby forming a hardened mold part 140. The mold part 140 is then removed from the mold cavity 26 (FIG. 23) and the first base mold 174, first insert mold 170, second insert mold 172, and second base mold 176 are then reconnected and filled once again with the molding material 122 to form additional mold parts 140.

Figure 24:
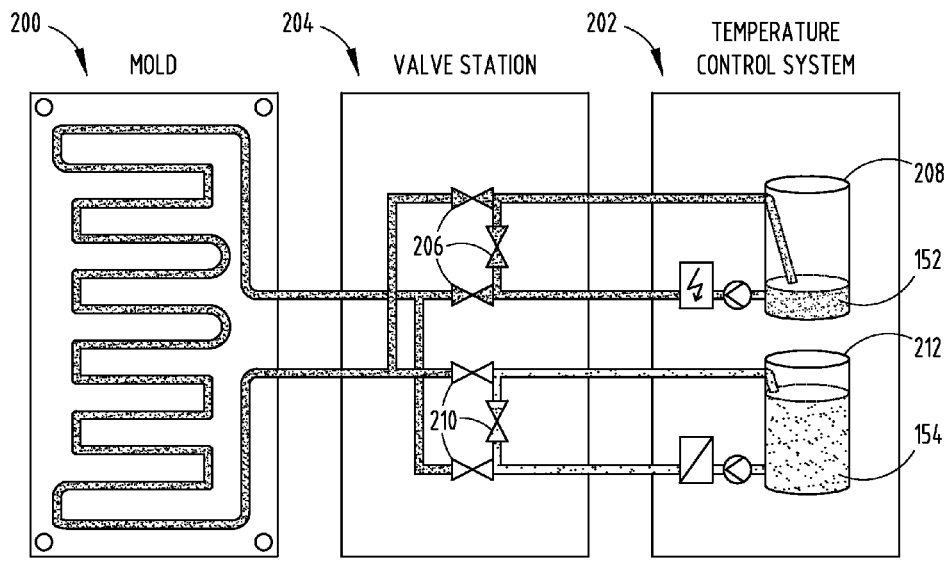
FIG. 24 is a schematic view of a temperature control station in connection with a mold assembly and introducing a heating fluid to the molding assembly.
Figure 25:
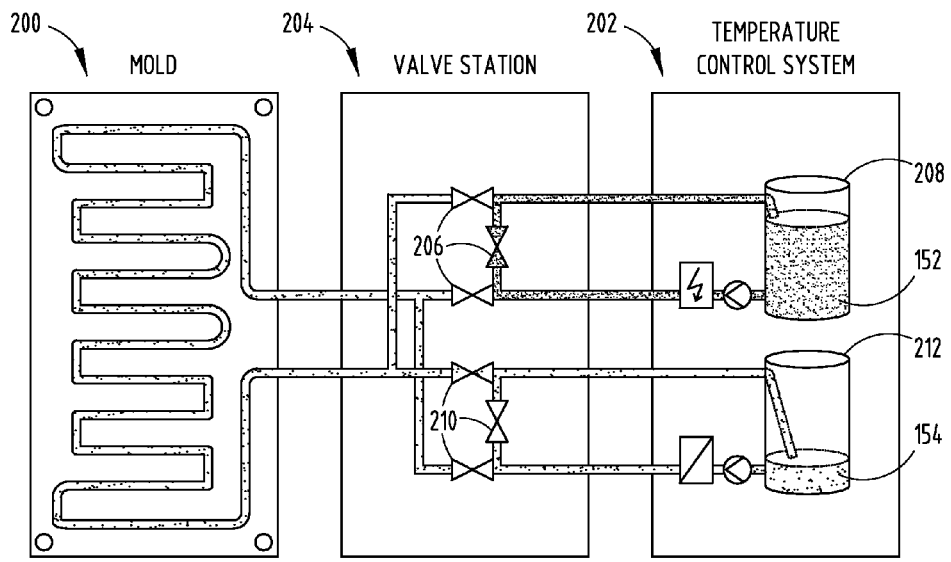
FIG. 25 is a schematic view of a temperature control station coupled with a mold assembly and introducing a cooling fluid to the mold assembly.

Turning now to FIGS. 24 and 25, it is generally contemplated that the heating fluid 152 and the cooling fluid 154 that extend through either the molding tool 12 or the insert molding assembly 168 (collectively referred to as the "molding assembly 200"), is relayed from a temperature control system 202. The temperature control system 202 includes the heating fluid 152 and the cooling fluid 154 that are in communication with the molding tool 12 or the insert molding assembly 168. When the molding assembly 200 is to be heated, typically during the initial insertion of molding material 122 into the molding assembly 200, a valve station 204 opens warmside valves 206 that allow communication of the heating fluid 152 from a heated fluid reservoir 208 to the molding assembly 200. At the same time, coolside valves 210 that control communication of the cooling fluid 154 from a cooled fluid reservoir 212 to the molding assembly 200 are closed, such that the cooling fluid 154 cannot reach the molding assembly 200. After the molding assembly 200 has reached the desired temperature for the desired length of time, the heating fluid 152 is then returned to the heated fluid reservoir 208, and the warmside valves 206 that allow fluid communication of the heating fluid 152 to the molding assembly 200 are closed. At the same time as shown in FIG. 25, the coolside valves 210 that were closed between the cooled fluid reservoir 212 and the molding assembly 200 are opened, such that cooling fluid 154 can flow to the molding assembly 200, consequently cooling the molding material 122 and forming the hardened mold part 140.

Figure 26:
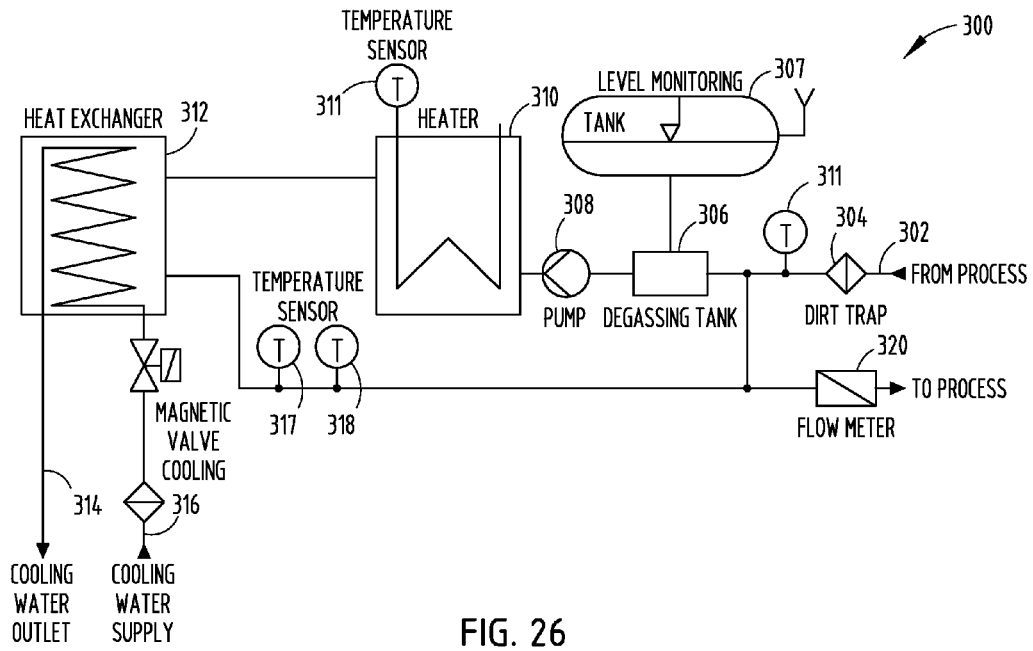
FIG. 26 is a schematic view of one embodiment of a heating system for use with a molding assembly.

FIG. 26 illustrates one embodiment of a heating system 300 for use with the molding assembly 200, as described above. The heating system 300 includes a heating fluid line 302 that passes a dirt trap 304, which removes any dirt or debris that may be in the heating fluid 152. The heating fluid 152 then passes through a temperature sensor 311 to confirm the temperature of the fluid 152 and then on to a degassing tank 306. The degassing tank 306 removes undesirable gases and other impurities from the heating fluid 152 before being moved by a pump 308 to a heater 310. The degassing tank is coupled to a level monitoring tank 307 which allows the user to monitor conditions in the degassing tank 306. The heating fluid 152 is generally cooler than desired, as the heating fluid 152 is returning from the molding assembly 200 where heat transfer occurred. Thus, it is desirable to reheat the heating fluid 152 in the heater 310. The heater 310 raises the temperature of the heating fluid 152 to a desired temperature before passing the heating fluid 152 through a heat exchanger 312, which assists in regulating the heat of the heating fluid 152. The heat exchanger 312 is coupled with a cooling water outlet 314 and a cooling water supply 316 that prevents the heat exchanger 312 from reaching too high of a temperature. The heating fluid 152 then passes first and second temperature sensors 317, 318 that confirm the temperature of the heating fluid 152 before the heating fluid 152 passes a flow meter 320 that provides a volumetric flow rate of the heating fluid 152 flowing to the molding assembly 200.

Figure 27:
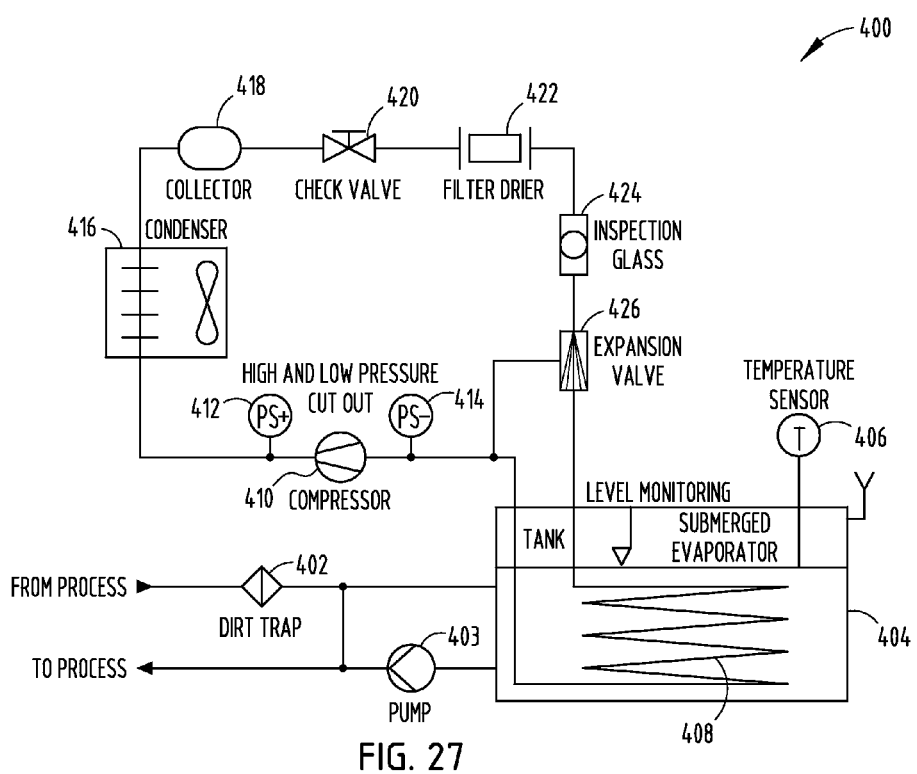
FIG. 27 is a schematic view of one embodiment of a cooling system for use with a molding tool of the present invention.

Referring now to FIG. 27, a cooling system 400 is illustrated that is adapted for connection with the molding assembly 200. The cooling fluid 154 passes through a dirt trap 402 and into a cooling tank 404, where the cooling fluid 154 is cooled to a desirable temperature. The cooling fluid 154 is generally warmer than desired, as the cooling fluid 154 is returning from the molding assembly 200 where heat from the molding assembly 200 and mold part 140 was transferred to the cooling fluid 154. Thus, it is desirable to recool the cooling fluid 154 in the cooling tank 404. A temperature sensor 406 monitors the temperature in the cooling tank 404. The cooling tank 404 is cooled by a submerged evaporator 408 disposed in the cooling tank 404. The submerged evaporator 408 is linked with a refrigerant that flows past a compressor 410 that is disposed between high and low pressure cutouts 412, 414. After moving past the compressor 410, the refrigerant is cooled in a condenser 416. After leaving the condenser 416, the refrigerant passes a collector 418 and a check valve 420, as well as a filter dryer 422, before moving past an inspection glass 424, where the refrigerant can be reviewed for color, consistency, impurities, etc. The refrigerant then passes through an expansion valve 426, where the refrigerant cools rapidly before entering the cooling tank 404. As the refrigerant passes through the cooling tank 404, the refrigerant cools the cooling tank 404 and the contents of the cooling tank 404, such that the cooling fluid 154 in the cooling tank 404 is cooled to a desired temperature. The temperature of the cooling fluid 154 is monitored by the temperature sensor 406. Cooling fluid 154 is then withdrawn from the cooling tank 404 via a pump 403 and pushed to the molding assembly 200, and more specifically, to the conformal lines 22 in the molding assembly 200.

Although FIGS. 26 and 27 are exemplary embodiments of heating and cooling systems that may be used in conjunction with a mold, it is contemplated that other heating and cooling systems may be used in conjunction with the mold, and specifically the molding tool, insert molds, and base molds, as disclosed above.

Figure 28:
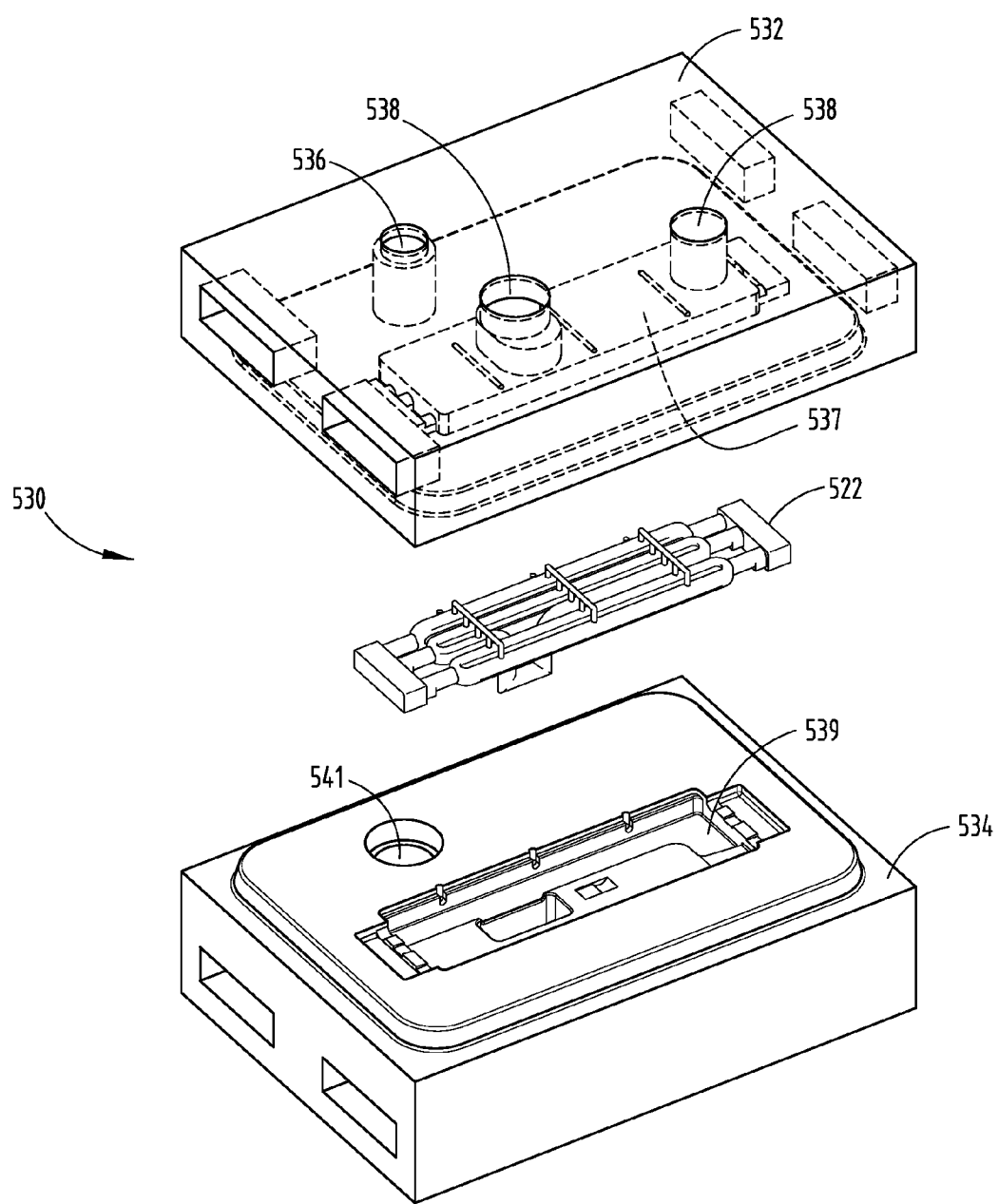
FIG. 28 is a top perspective exploded view of a sand mold package comprising a cope mold, a drag mold, and a core.

Referring now to FIG. 28, another embodiment of the present invention is shown wherein a sand mold package 530 includes an upper mold or cope mold 532, a lower mold or drag mold 534, and a core 522. The sand mold package 530 is made entirely of mold and core components, which are printed from a sandprinter, and subsequently removed from the job box. The sand mold package 530, as shown, is being prepared for casting of a molten material in a similar fashion as described above.

Figure 29:
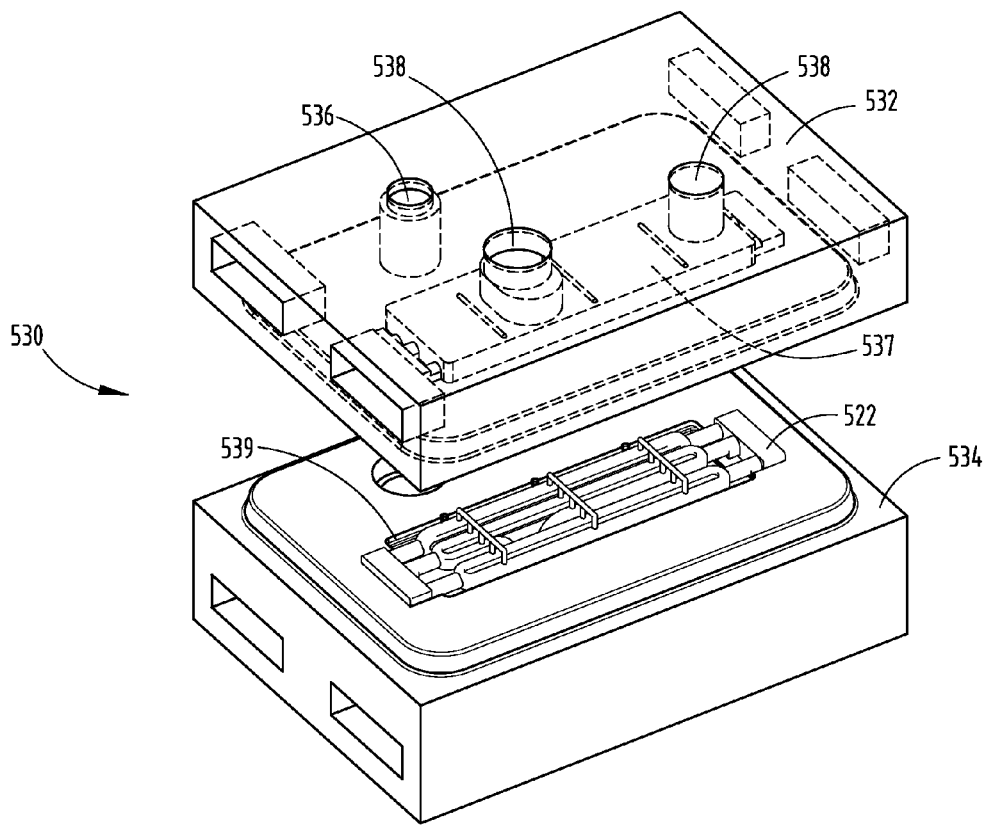
FIG. 29 is a top perspective view of the sand mold package of FIG. 28 with the core inserted into the drag mold.
Figure 30:
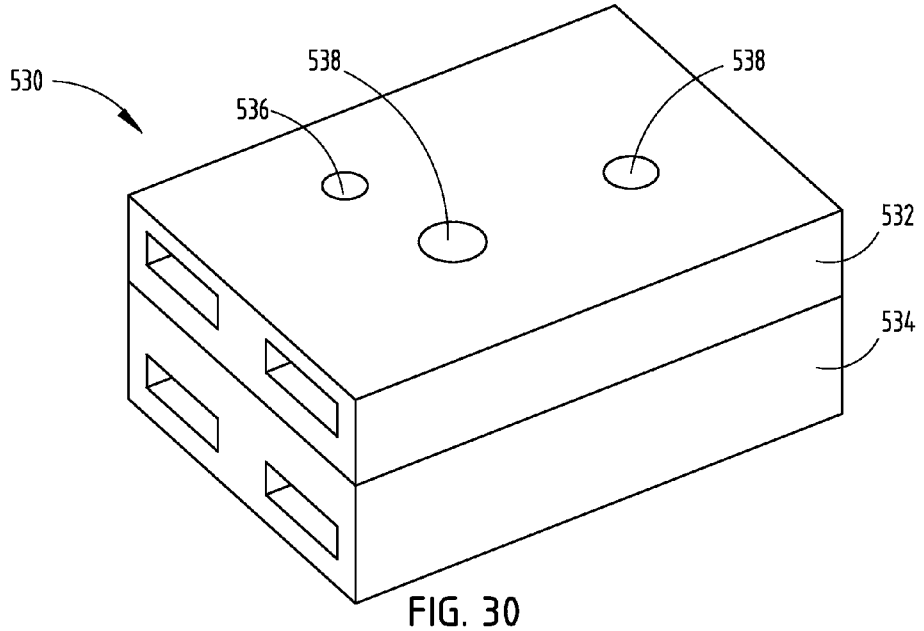
FIG. 30 is a top perspective view of the sand mold package of FIG. 28 with the cope and drag molds positioned adjacent one another in preparation for casting of a molten material.

Referring now to FIGS. 29 and 30, the core 522 is shown inserted into a cavity 539 disposed on a top surface of the drag mold 534, wherein the cavity 539 forms a molding cavity, which is defined by the union of the cope mold 532 having a cavity 537 and the drag mold 534. As shown in FIG. 30, the sand mold package 530 is fully assembled with the cope mold 532 and the drag mold 534 stacked upon one another. As shown in FIG. 28, a mold cavity is created by the union of cavities 537, 539 disposed in both the cope mold 532 and the drag mold 534, respectively. As shown in FIGS. 28-30, apertures 536 and 538 are shown disposed on the upper surface of the cope mold 532. Aperture 536 represents an access point for pouring a molten material into the sand mold package 530 as assembled in FIG. 30. The access point 536 further connects to a series of runners 541, as shown in FIG. 28, which allows the molten material to pass from the cope mold 532 to the drag mold 534 through access point 536. In this way, the runners 541 fill the mold cavity created by the union of cavities 539, 537 of the cope mold 532 and the drag mold 534, respectively, from the bottom up. As the molten material fills the mold cavity, excess molten material begins to fill risers 538 disposed on a top surface of the cope mold 532. The risers 538 help the casting operator to know when the mold cavity of the sand mold package 530 has been filled, and also allow for molten material to be available to fill any areas of the mold cavity as the molten material settles.

Figure 31:
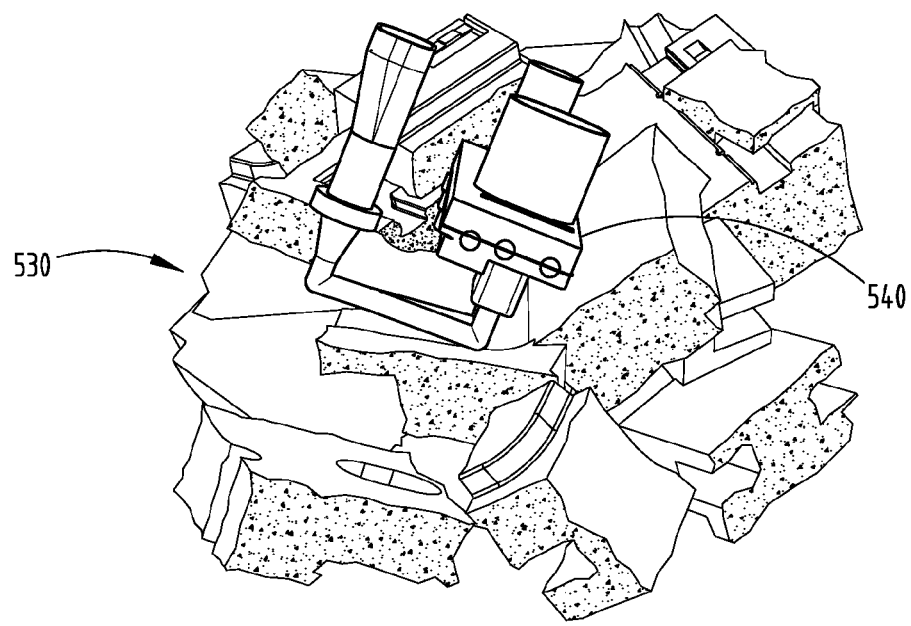
FIG. 31 is a perspective view of a cast part produced from the sand mold package of FIG. 28 with the sand mold package of FIG. 28 being broken away.
Figure 32:
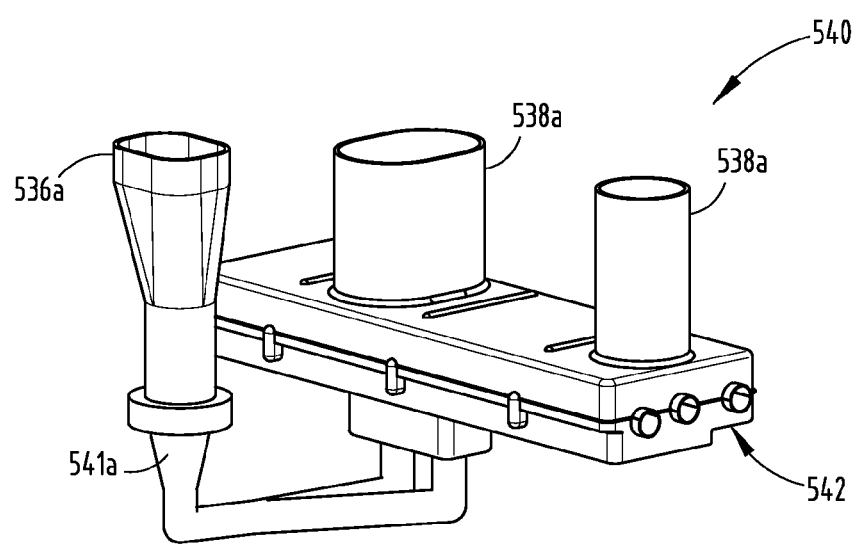
FIG. 32 is a perspective view of the cast molding tool as produced by the sand mold package of FIG. 28.

Once the molten material has solidified within the sand mold package 530, the sand mold package 530 is broken away, as shown in FIG. 31, to reveal a cast part 540. As shown in FIG. 32, the cast part 540 is shown with casting material used to fill the access point 536, runner system 541, and risers 538 of the sand mold package 530 shown in FIGS. 28-30 being hardened and solidified on a molding tool 542. These cast configurations indicated as 536a, 538a and 541a are machined off or otherwise removed from the molding tool 542 to reveal a tool that is ready for use in a molding process.

The mold core package, and the components included therein, as well as the methods of making tools from the mold core package, as disclosed herein, provide an improved ability to cool all areas of a molding tool evenly thereby reducing the potential for warpage, cracks, etc. In addition, the accuracy associated with making the mold tools from the printing process provides for better part quality, precision, and design flexibility. The conformal lines allow for improved thermal capabilities. Multiple lines for heating and cooling are eliminated in favor of integrated heating and cooling conformal lines that can be configured to match the desired thermal loading required to improve tool quality as well as tool and part quality. Further, the mold core package components and the tools made from the mold core package components can be designed to improve cycle time, thereby increasing part manufacturing capacity. Class A surfaces that provide a smooth glossy finish (i.e. piano black) can be developed without the need for additional paint or gloss on the finished parts. Further, Class A surfaces having etched patterns can be developed by etching a pattern onto a mold surface of a molding tool, thereby resulting in a finished part having a pattern embossed thereon.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A mold core package for forming a molding tool, comprising:
   a plurality of stacked particulate layers including a binding agent, wherein the plurality of stacked particulate layers form sacrificial walls defining a mold cavity configured to form the molding tool; and
   a sacrificial displacement line and a sacrificial displacement body extending from the mold core package and adapted to displace a molten material applied to the mold core package, wherein the molten material displaced by the sacrificial displacement line and the sacrificial displacement body form a conformal fluid line and a conformal reservoir proximate a molding surface of the formed molding tool.

2. The mold core package of claim 1, wherein the sacrificial displacement body includes at least one recess adapted to receive the molten material and define a turbulence inducing member in the molding tool, adapted to alter the flow of a temperature controlling fluid disposed within the sacrificial displacement body during a molding process.

3. The mold core package of claim 1, wherein the sacrificial displacement line is integrally connected to the sacrificial displacement body.

4. The mold core package of claim 1, further comprising:
   a junction portion in the sacrificial displacement body adapted to receive the molten material and define a support column disposed in an interior of the conformal reservoir formed in the molding tool.

5. The mold core package of claim 1, further comprising:
   an injection port extending through the mold core package.

* * * * *